July 3, 1962  K. W. TANTLINGER  3,042,227
SHIPBOARD FREIGHT CONTAINER TRANSFERRING APPARATUS
Filed Sept. 26, 1958  30 Sheets-Sheet 1

INVENTOR
KEITH W. TANTLINGER
BY
ATTORNEY

July 3, 1962 K. W. TANTLINGER 3,042,227
SHIPBOARD FREIGHT CONTAINER TRANSFERRING APPARATUS
Filed Sept. 26, 1958 30 Sheets-Sheet 2

INVENTOR
KEITH W. TANTLINGER

BY *Albert H. Kirchner*

ATTORNEY

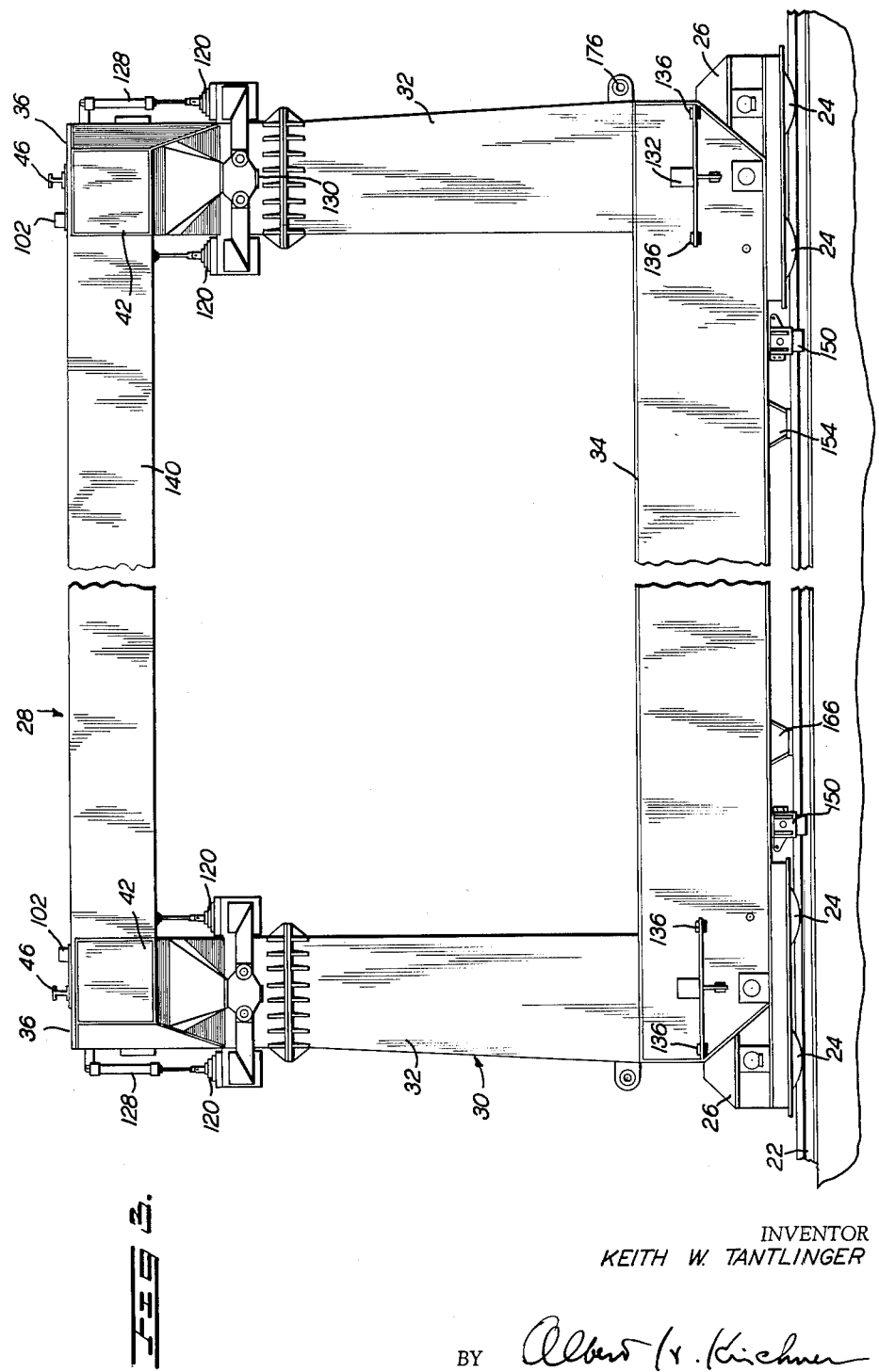

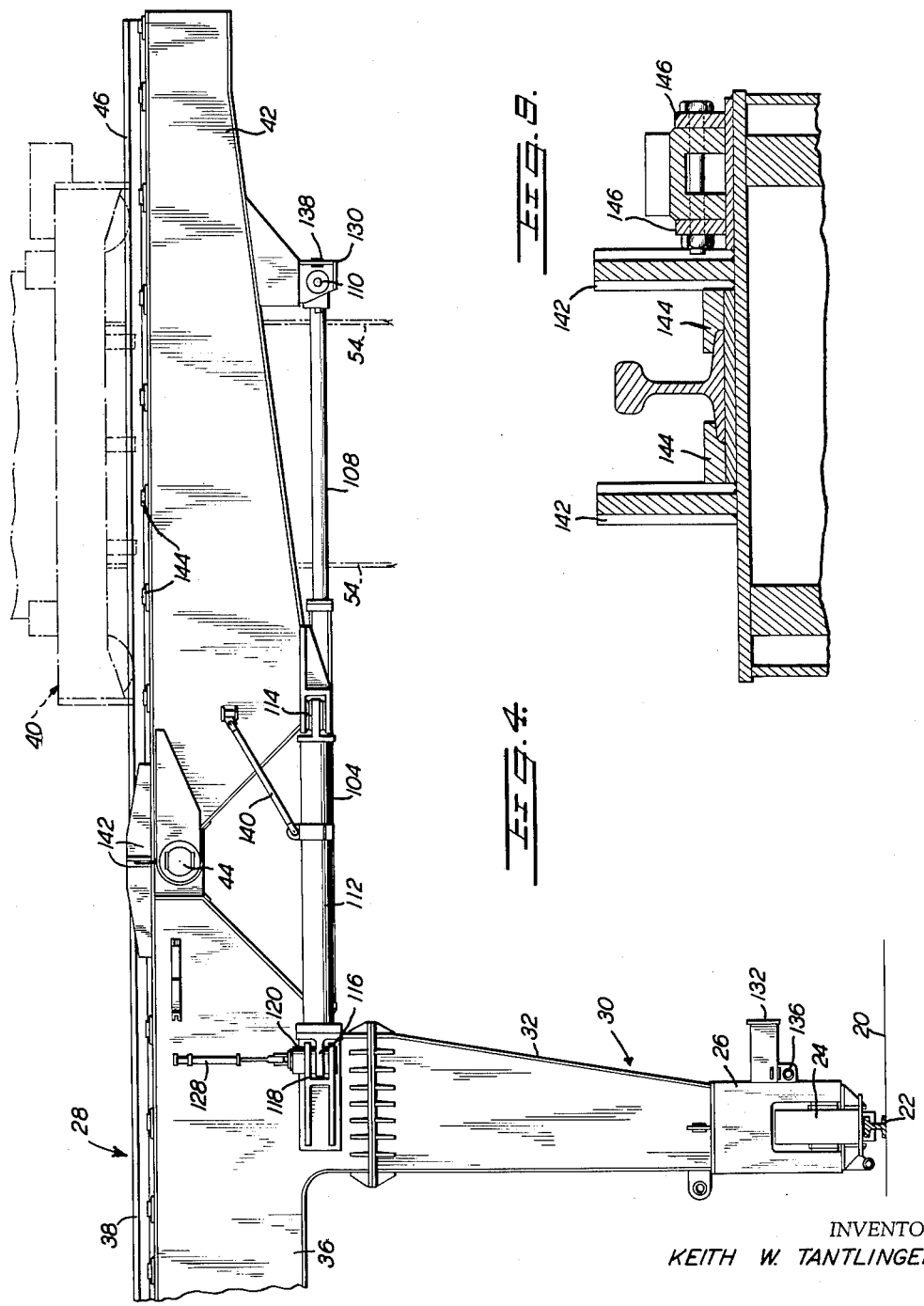

July 3, 1962 K. W. TANTLINGER 3,042,227
SHIPBOARD FREIGHT CONTAINER TRANSFERRING APPARATUS
Filed Sept. 26, 1958 30 Sheets-Sheet 5
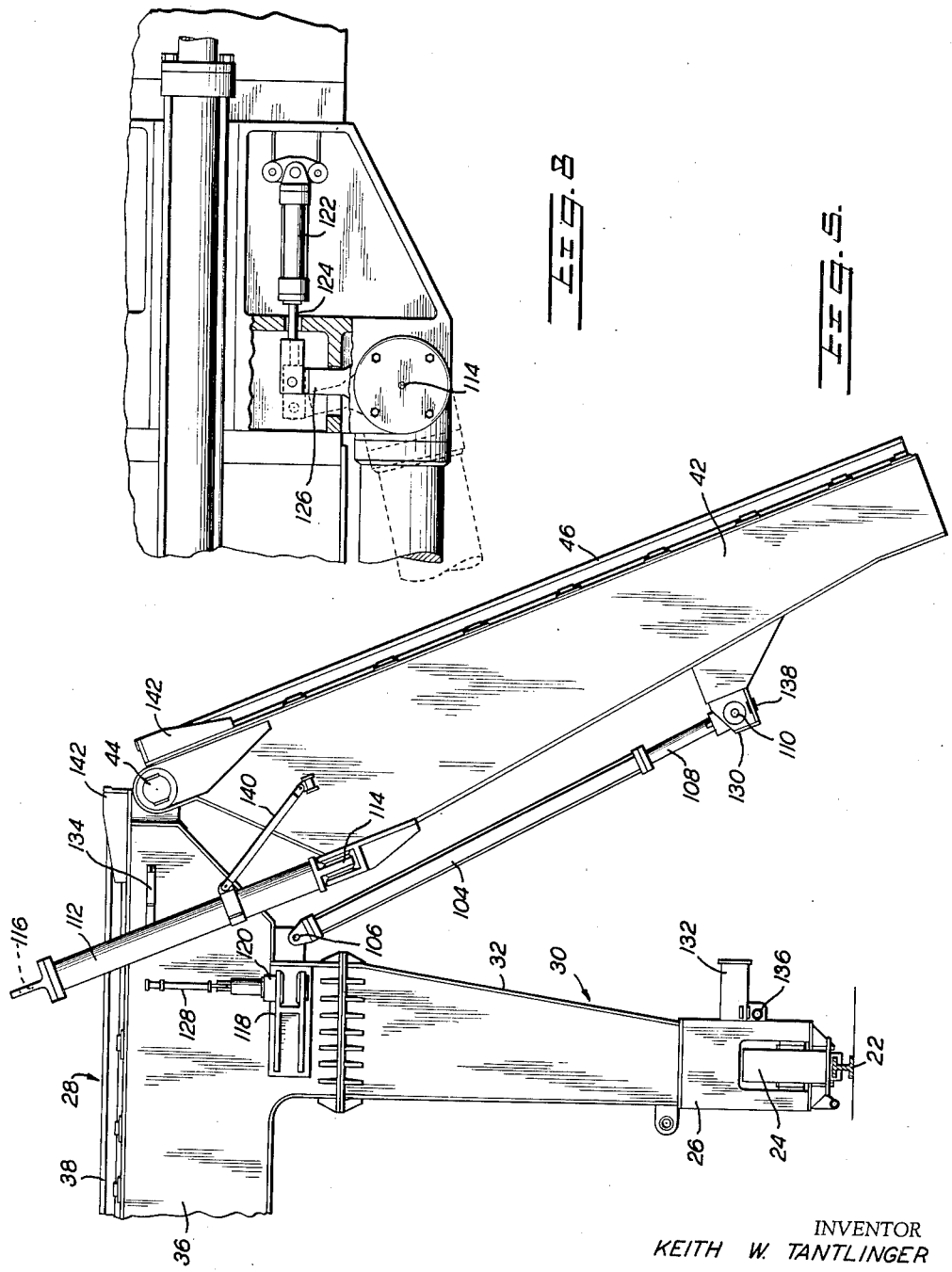
INVENTOR
KEITH W. TANTLINGER
BY *Albert R. Kirchner*
ATTORNEY

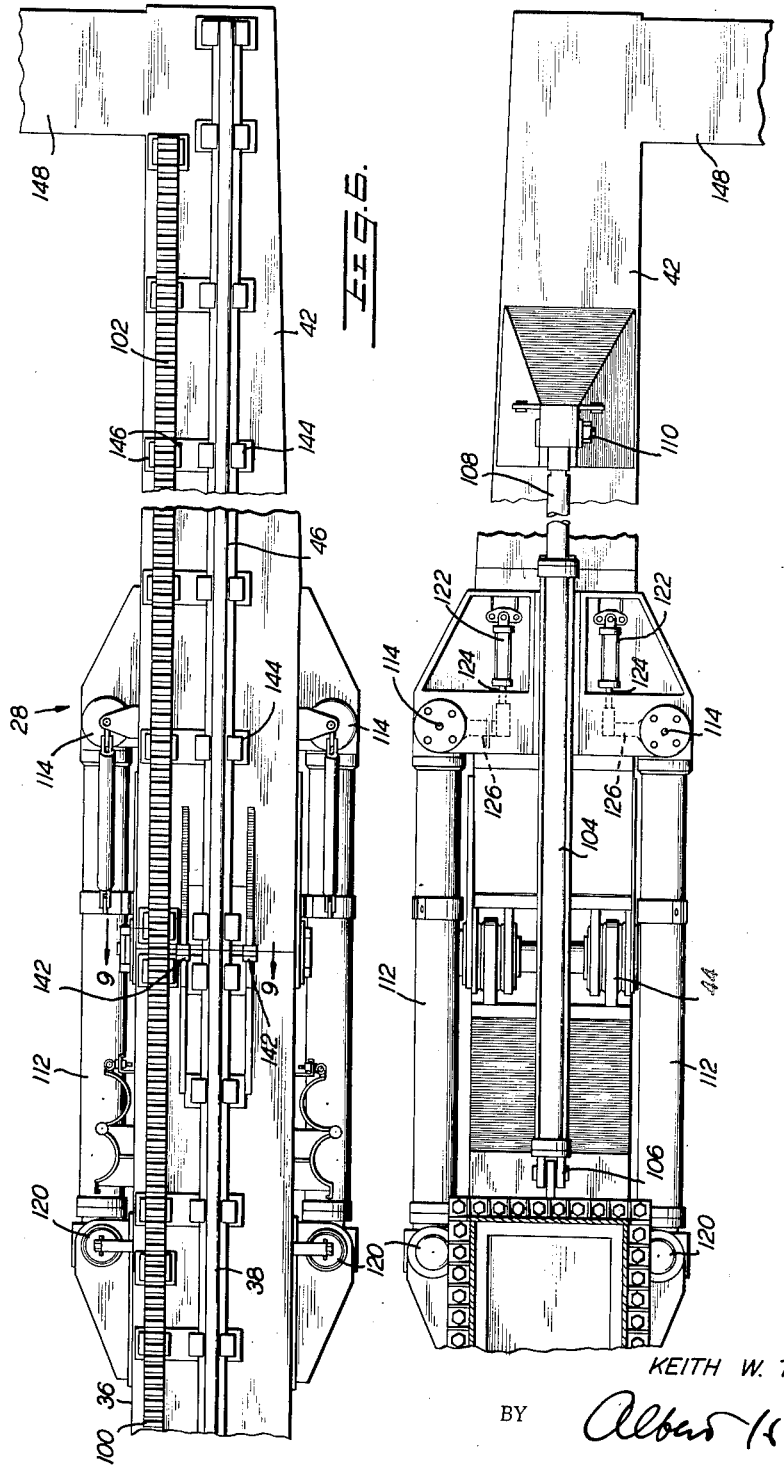

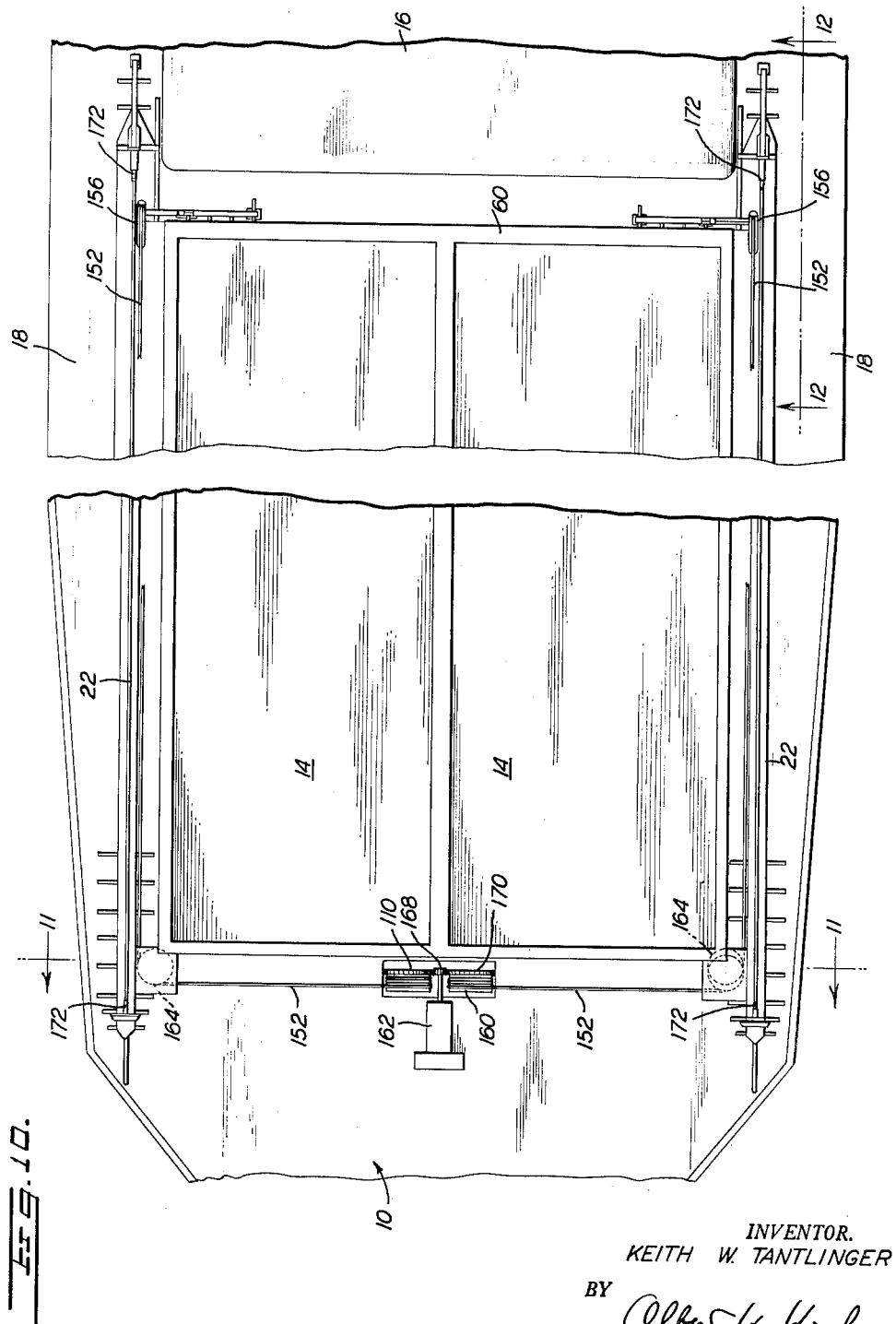

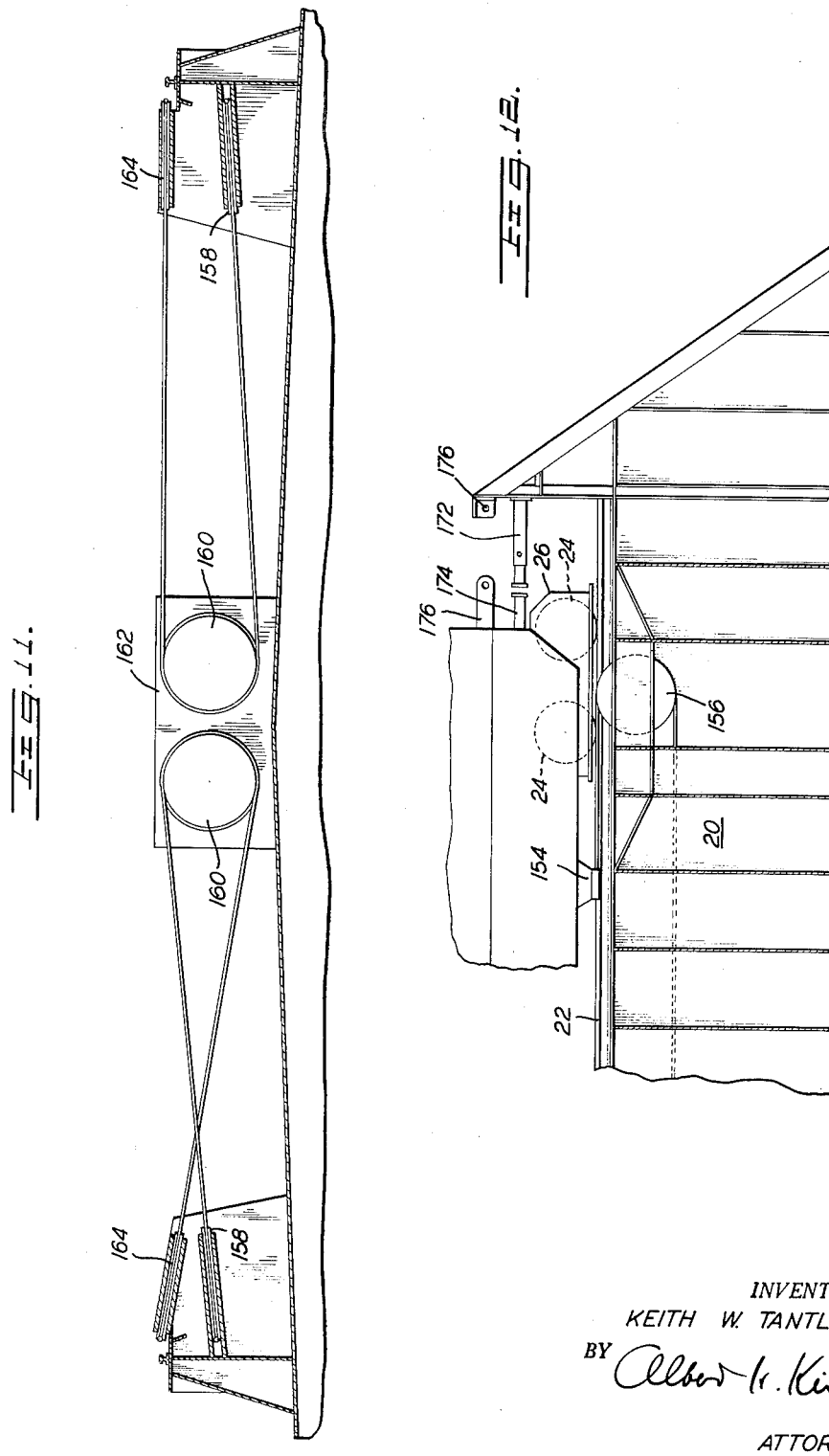

July 3, 1962 K. W. TANTLINGER 3,042,227
SHIPBOARD FREIGHT CONTAINER TRANSFERRING APPARATUS
Filed Sept. 26, 1958 30 Sheets-Sheet 9
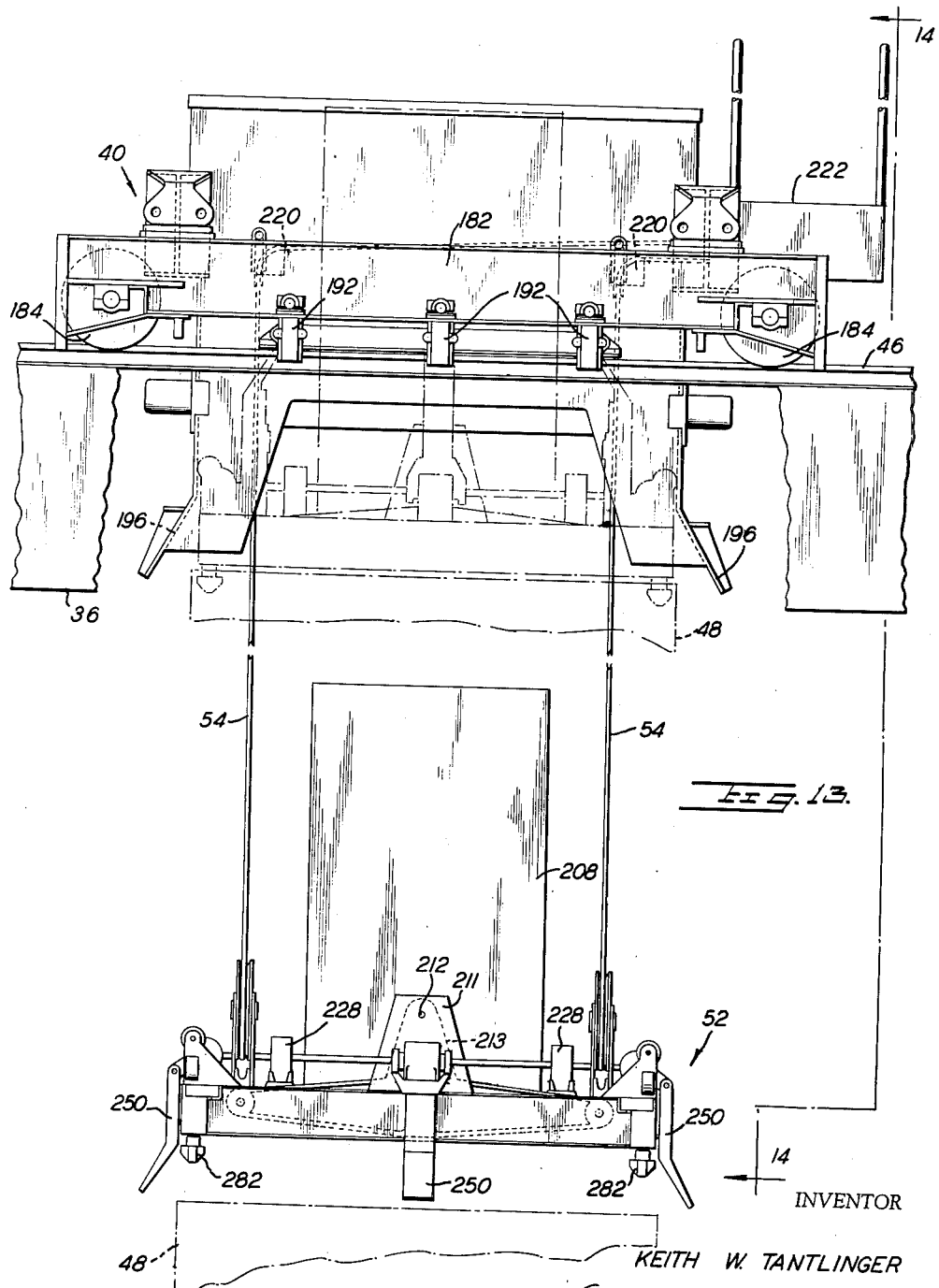
INVENTOR
KEITH W. TANTLINGER
BY
ATTORNEY

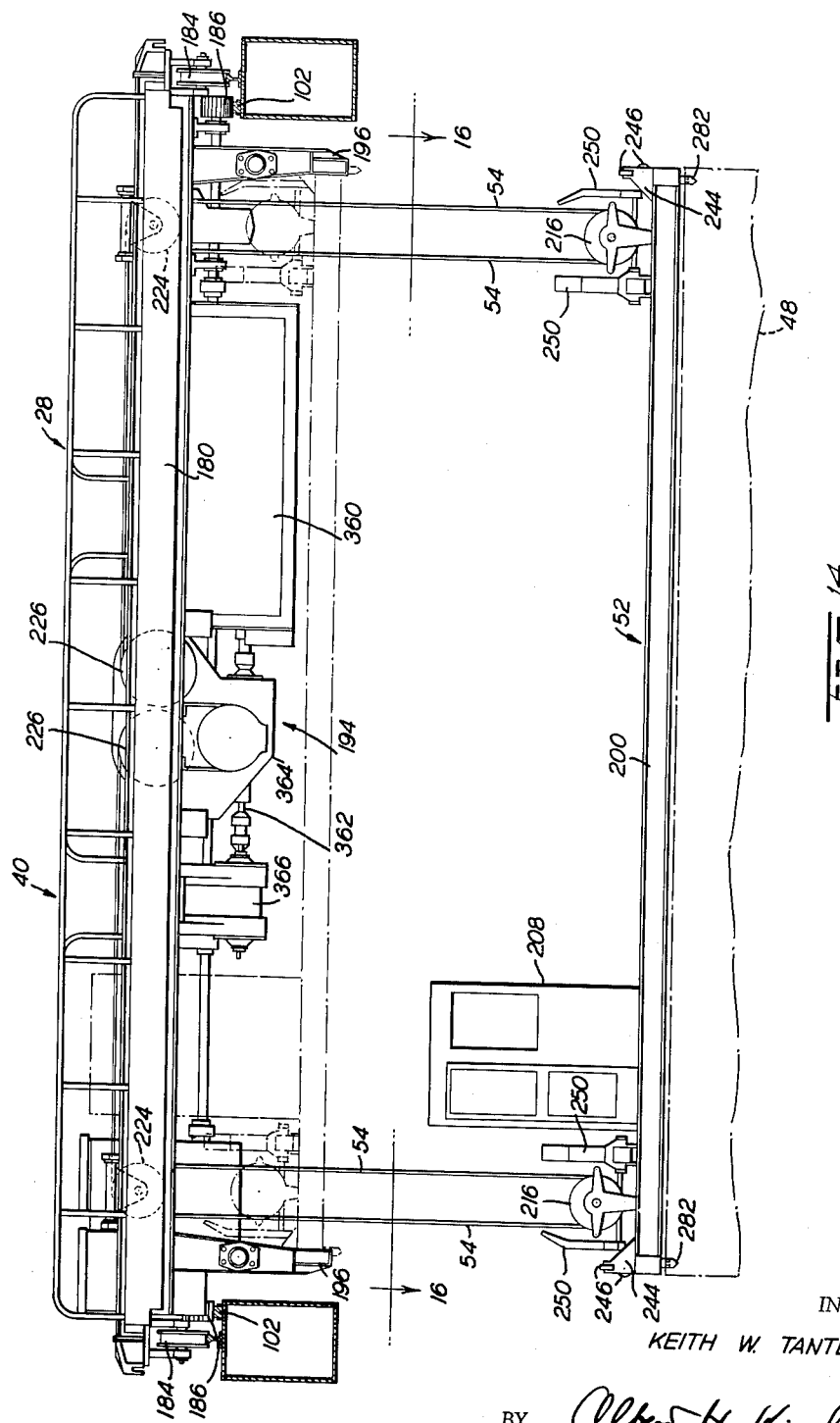

July 3, 1962 K. W. TANTLINGER 3,042,227
SHIPBOARD FREIGHT CONTAINER TRANSFERRING APPARATUS
Filed Sept. 26, 1958 30 Sheets-Sheet 11
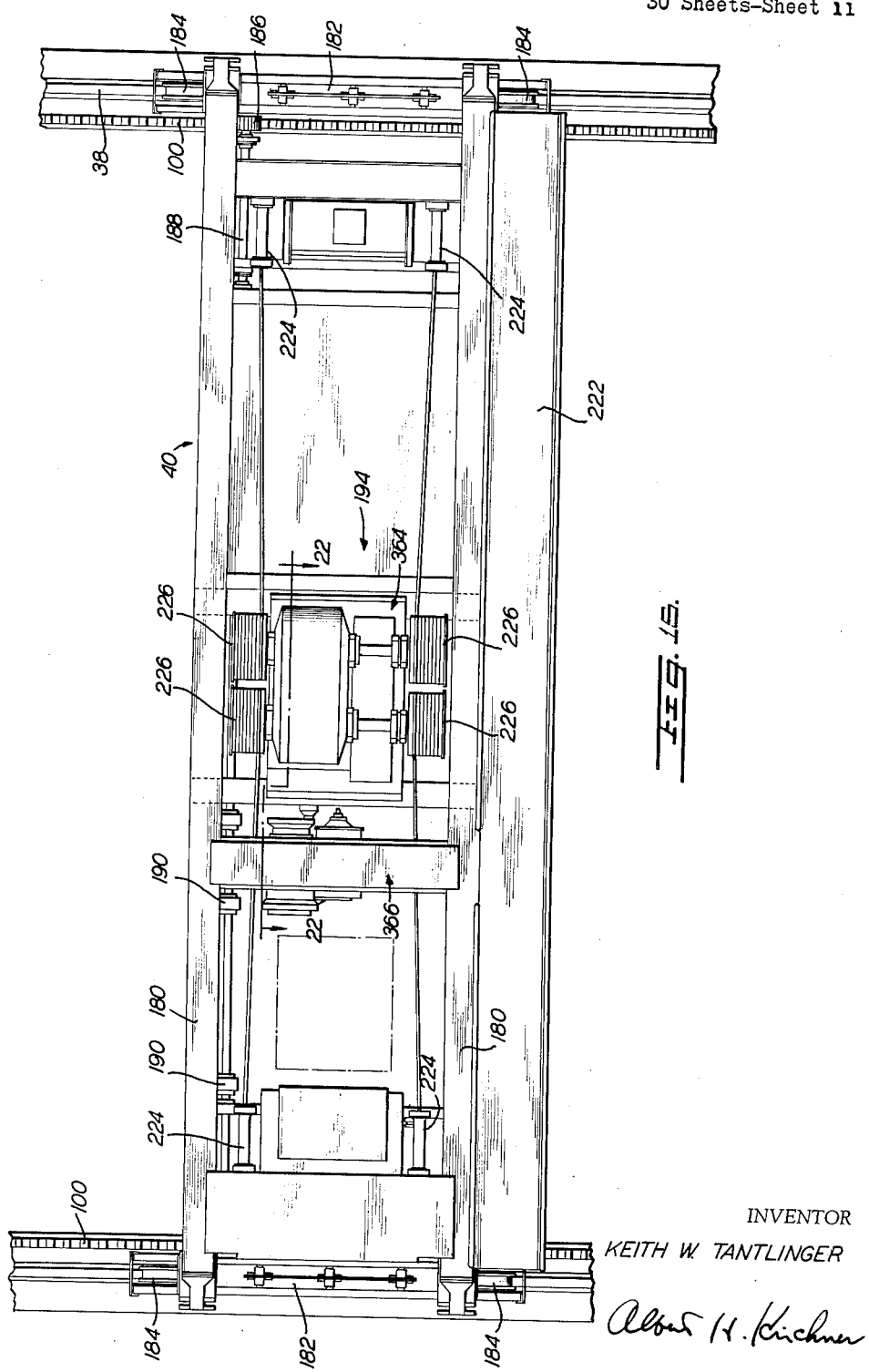
INVENTOR
KEITH W. TANTLINGER
Albert H. Kirchner
ATTORNEY

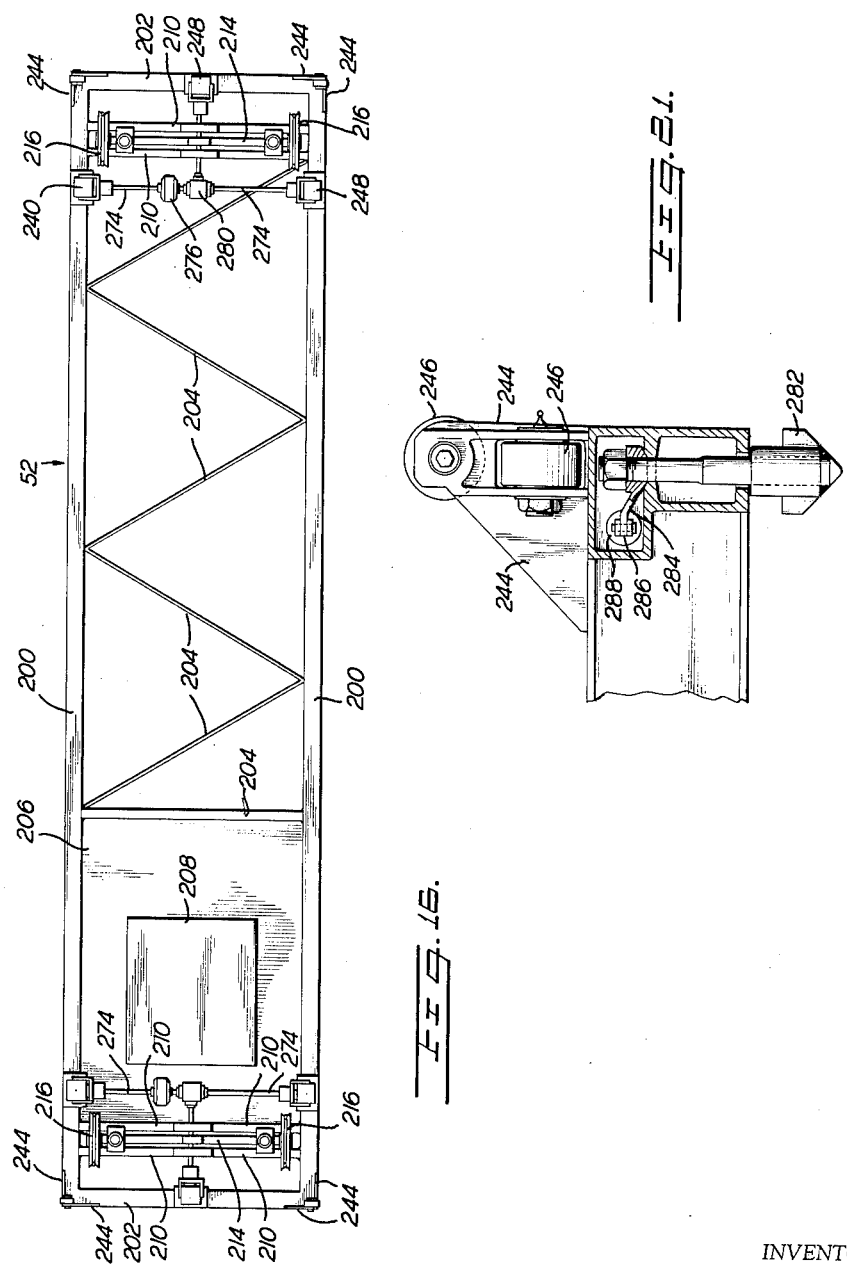

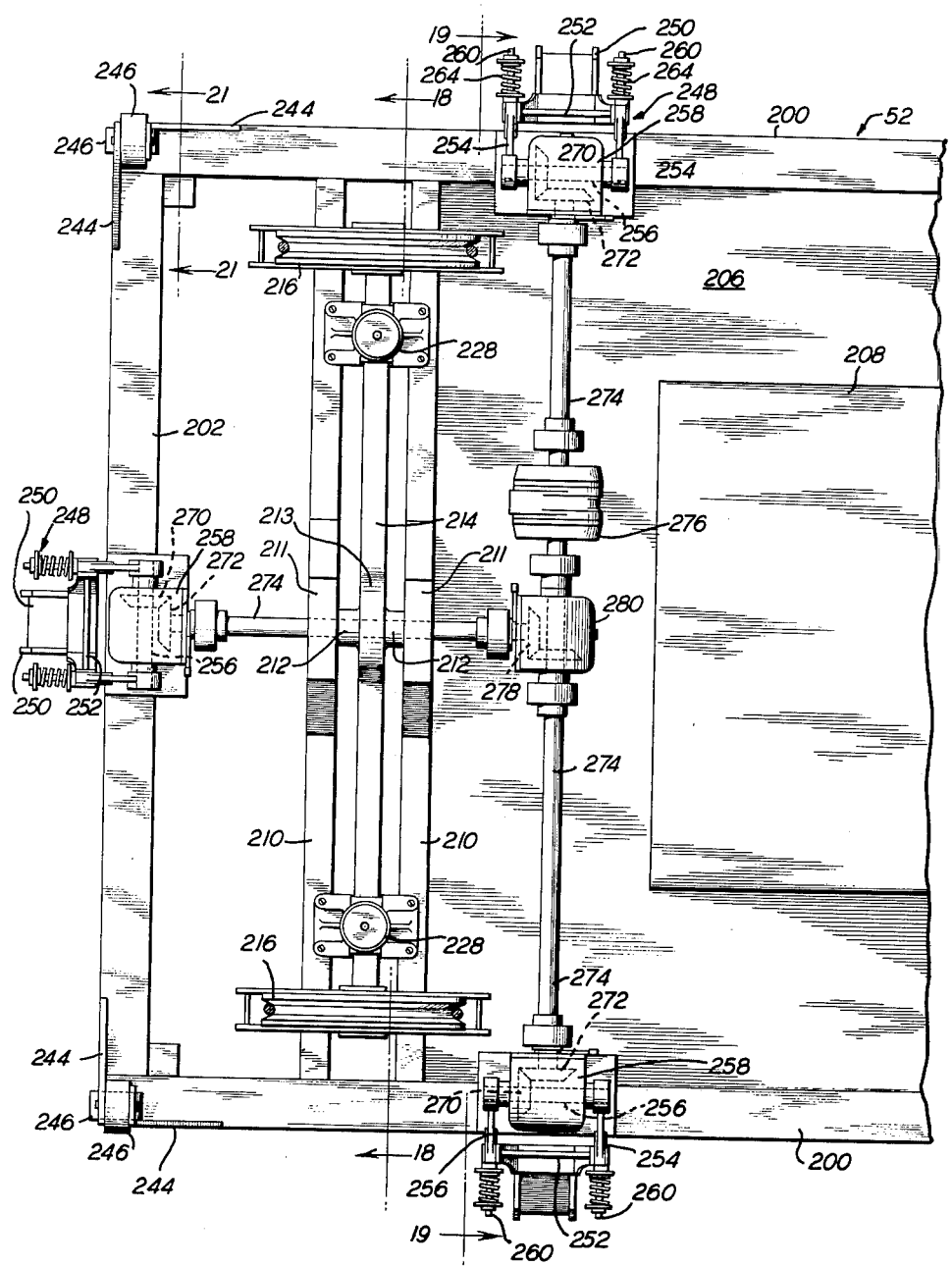

July 3, 1962 K. W. TANTLINGER 3,042,227
SHIPBOARD FREIGHT CONTAINER TRANSFERRING APPARATUS
Filed Sept. 26, 1958 30 Sheets-Sheet 14
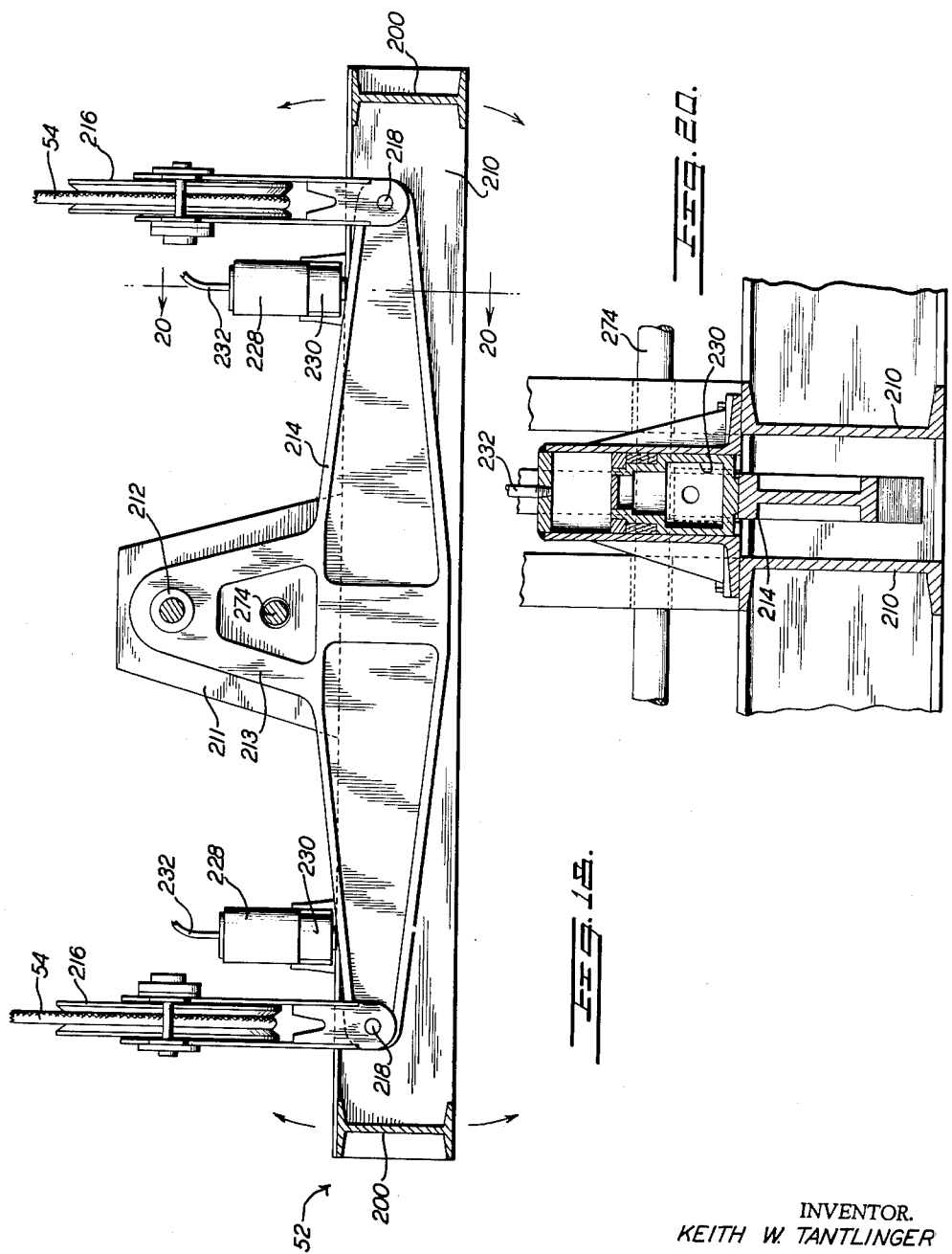
INVENTOR.
KEITH W. TANTLINGER
BY
ATTORNEY July 3, 1962  K. W. TANTLINGER  3,042,227
SHIPBOARD FREIGHT CONTAINER TRANSFERRING APPARATUS
Filed Sept. 26, 1958  30 Sheets-Sheet 15
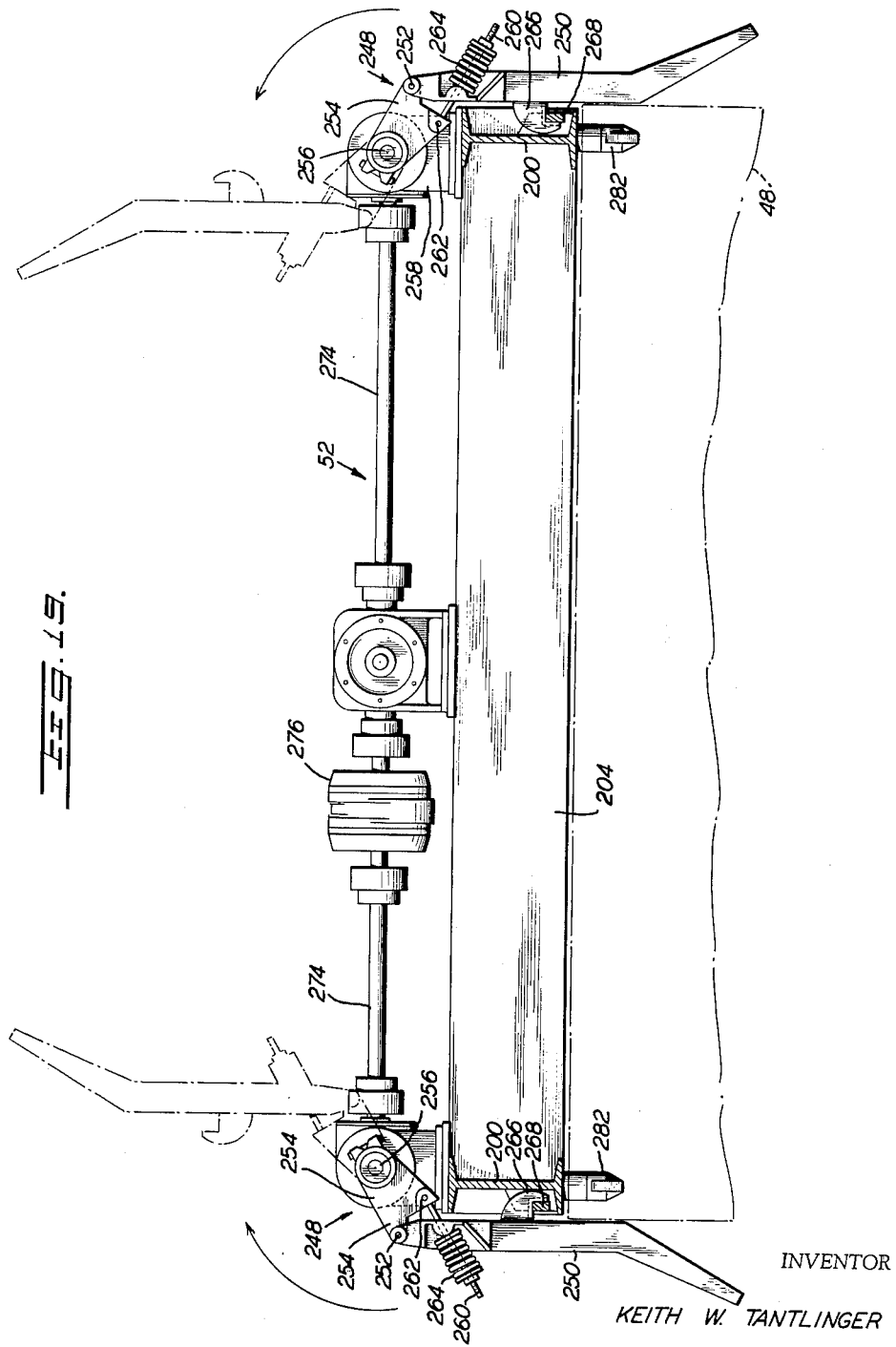
INVENTOR
KEITH W. TANTLINGER
BY
ATTORNEY July 3, 1962 K. W. TANTLINGER 3,042,227
SHIPBOARD FREIGHT CONTAINER TRANSFERRING APPARATUS
Filed Sept. 26, 1958 30 Sheets-Sheet 16

INVENTOR
KEITH W. TANTLINGER
BY
Albert R. Kirchner
ATTORNEY

July 3, 1962 K. W. TANTLINGER 3,042,227
SHIPBOARD FREIGHT CONTAINER TRANSFERRING APPARATUS
Filed Sept. 26, 1958 30 Sheets-Sheet 17

INVENTOR.
KEITH W. TANTLINGER
BY Albert B. Kirchner
ATTORNEY

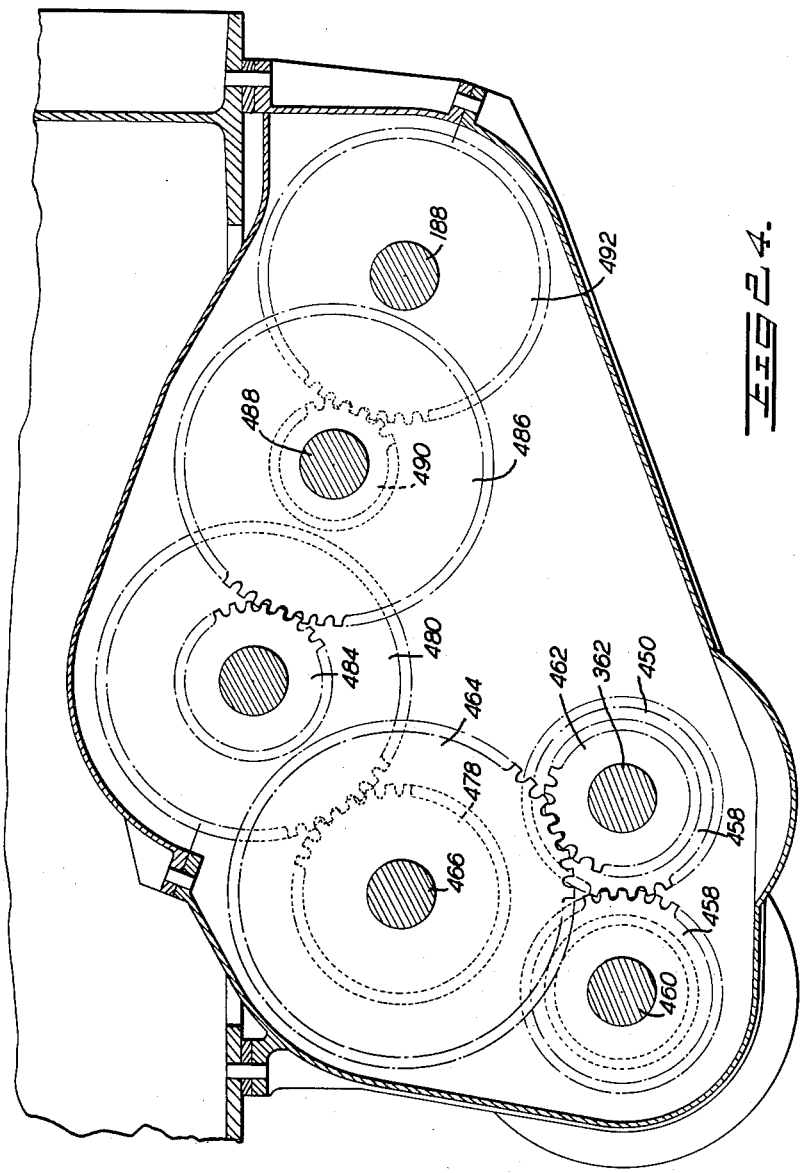

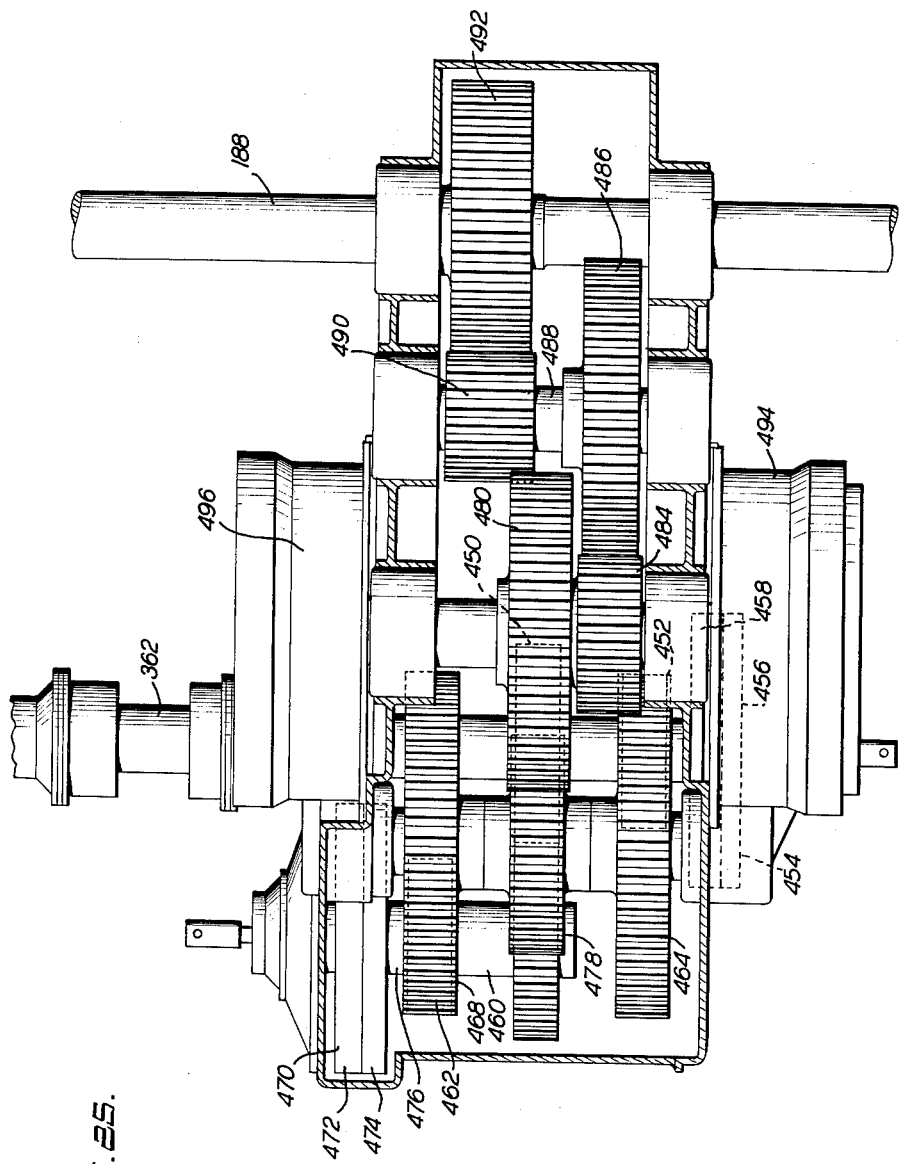

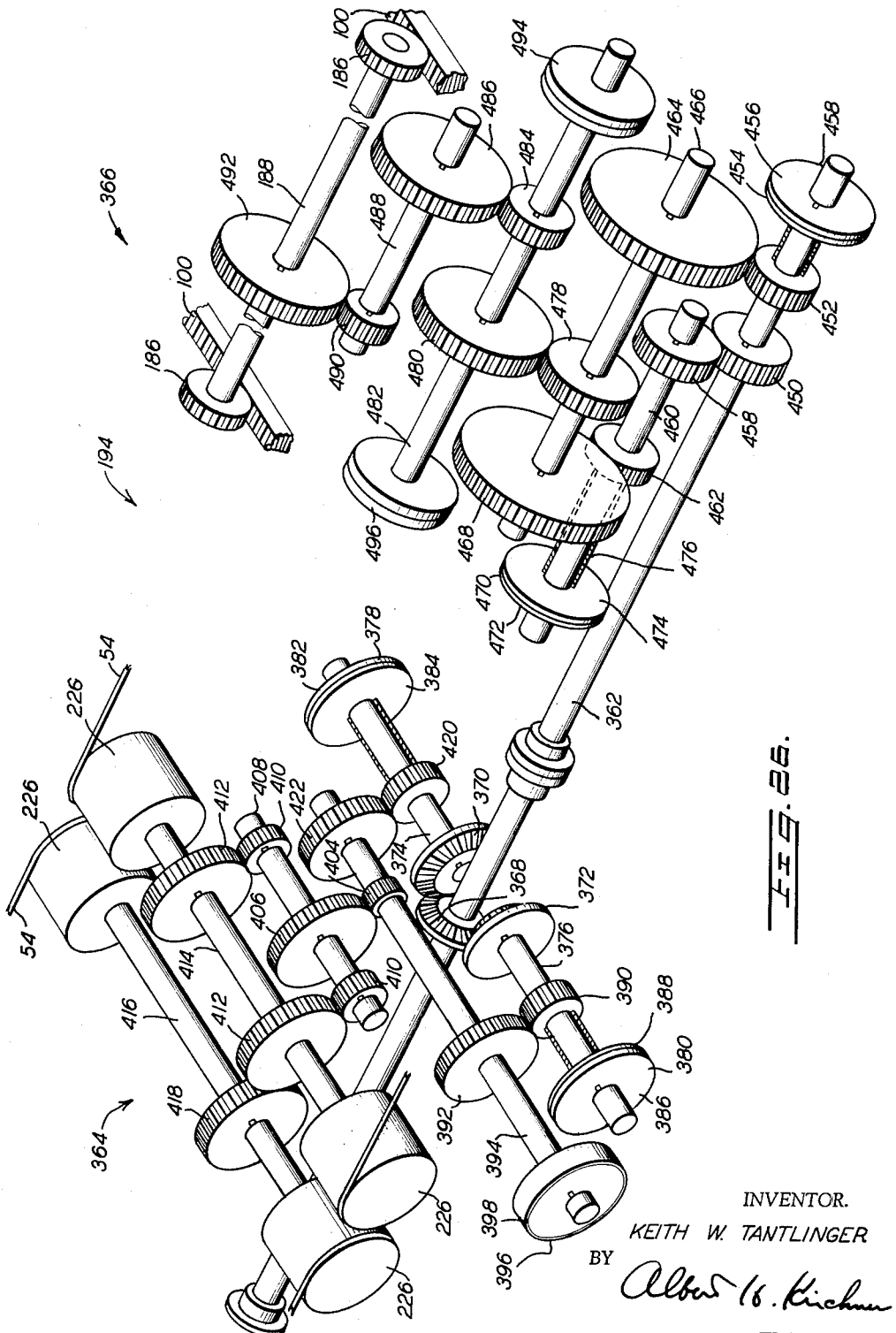

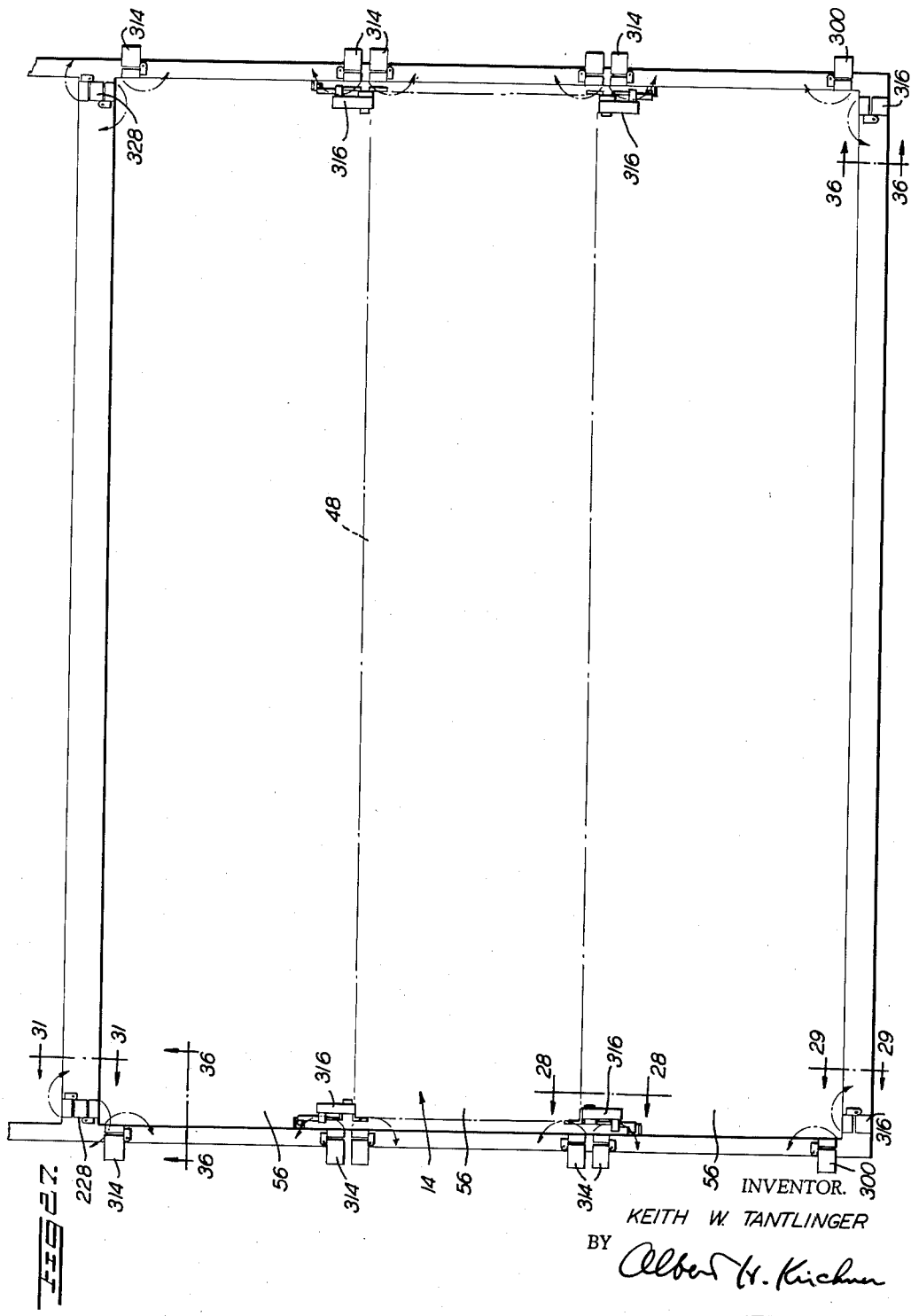

July 3, 1962 K. W. TANTLINGER 3,042,227
SHIPBOARD FREIGHT CONTAINER TRANSFERRING APPARATUS
Filed Sept. 26, 1958 30 Sheets-Sheet 22
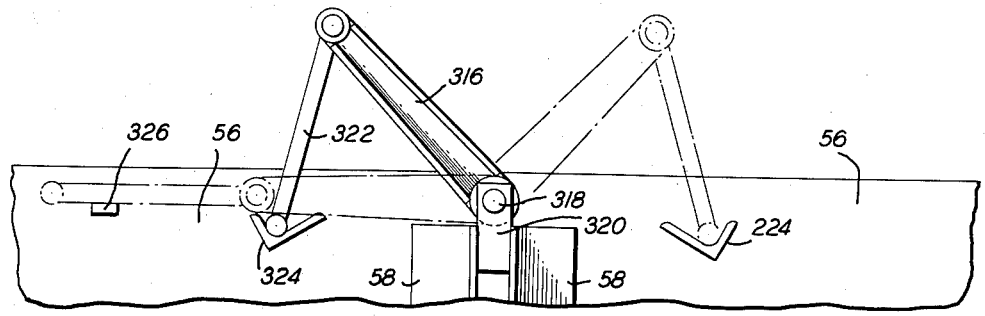
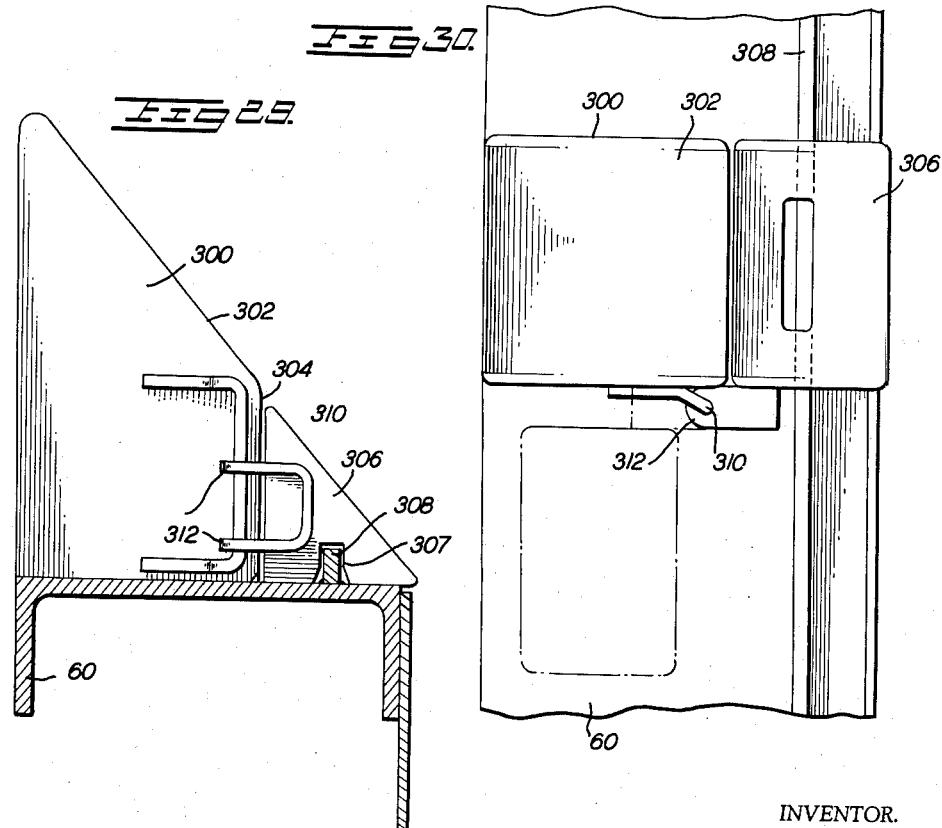
INVENTOR.
KEITH W. TANTLINGER
BY Albert H. Kirchner
ATTORNEY July 3, 1962 K. W. TANTLINGER 3,042,227
SHIPBOARD FREIGHT CONTAINER TRANSFERRING APPARATUS
Filed Sept. 26, 1958 30 Sheets-Sheet 23
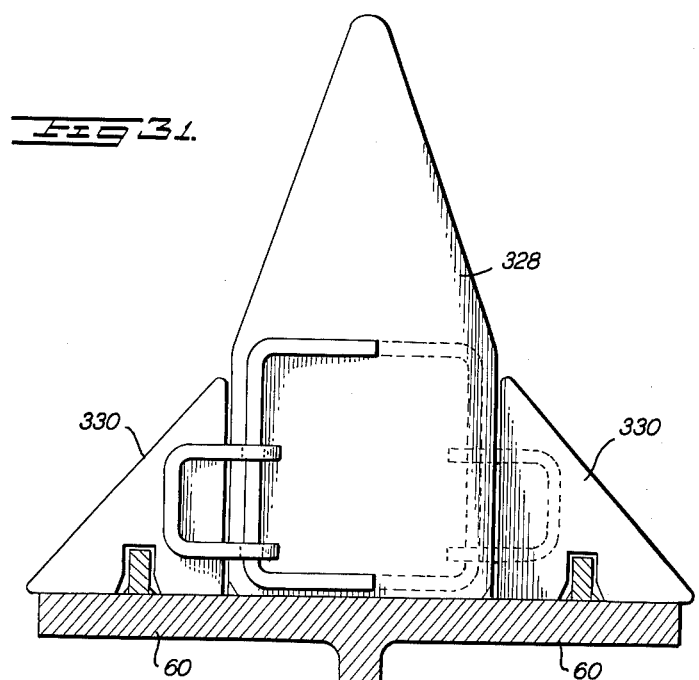
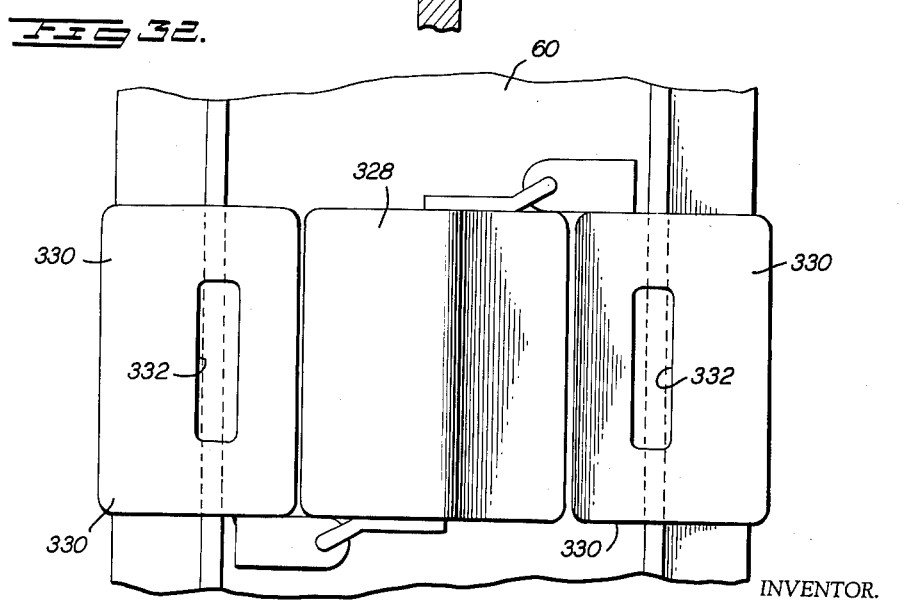
INVENTOR.
KEITH W. TANTLINGER
BY Albert K. Kirchner
ATTORNEY July 3, 1962 K. W. TANTLINGER 3,042,227
SHIPBOARD FREIGHT CONTAINER TRANSFERRING APPARATUS
Filed Sept. 26, 1958 30 Sheets-Sheet 24

INVENTOR.
KEITH W. TANTLINGER
BY Albert H. Kirchner
ATTORNEY

July 3, 1962      K. W. TANTLINGER      3,042,227
SHIPBOARD FREIGHT CONTAINER TRANSFERRING APPARATUS
Filed Sept. 26, 1958      30 Sheets-Sheet 25
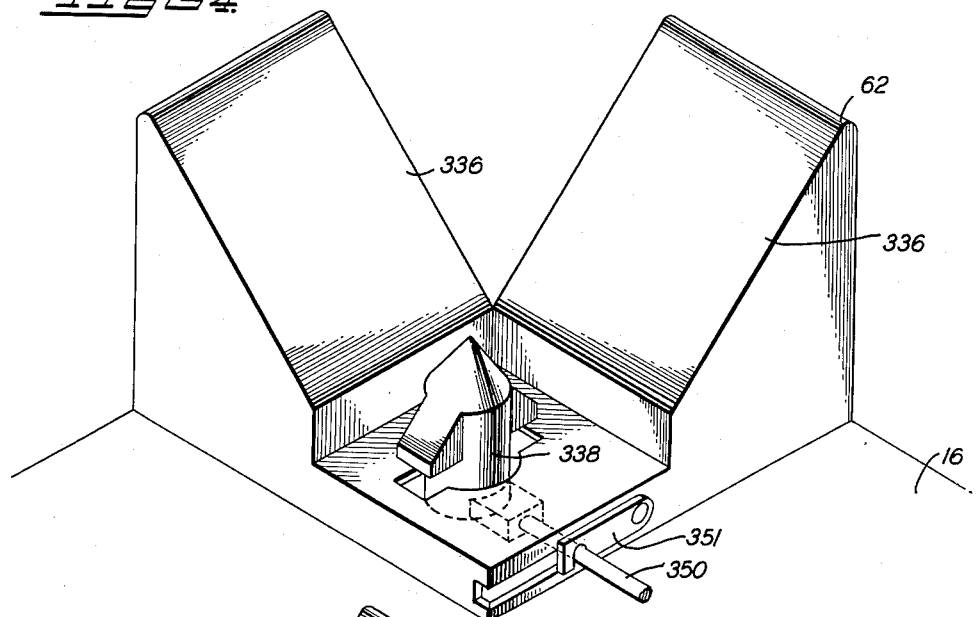
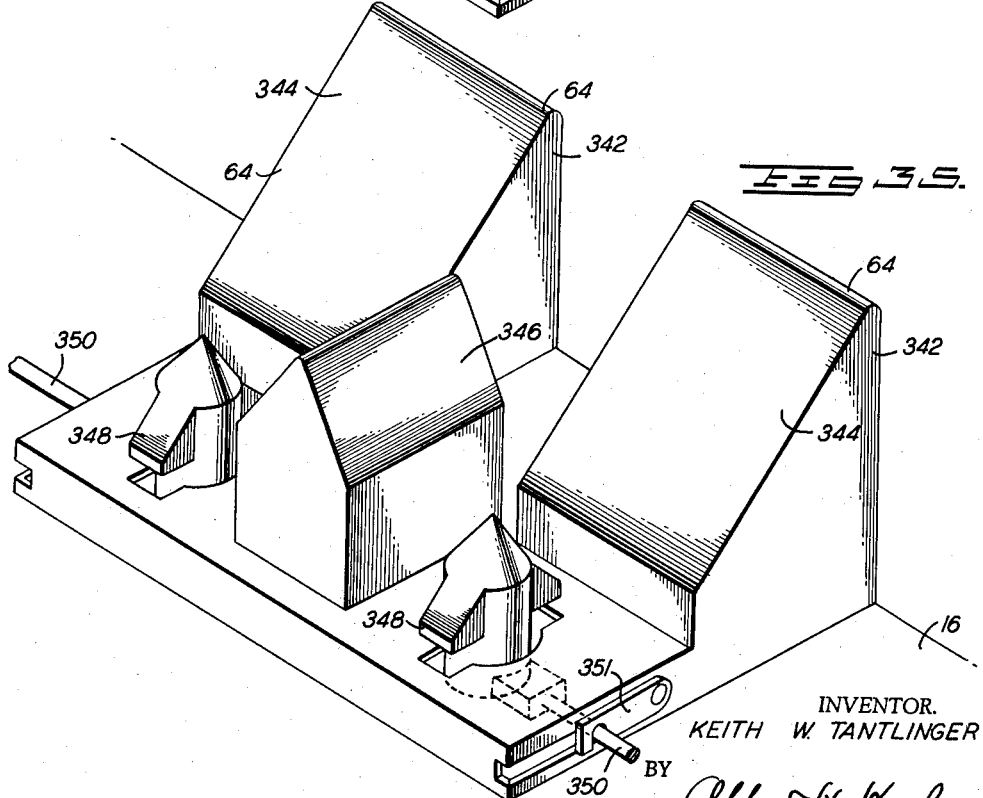
INVENTOR.
KEITH W. TANTLINGER
BY
Albert H. Kirchner
ATTORNEY July 3, 1962  K. W. TANTLINGER  3,042,227
SHIPBOARD FREIGHT CONTAINER TRANSFERRING APPARATUS
Filed Sept. 26, 1958  30 Sheets-Sheet 26
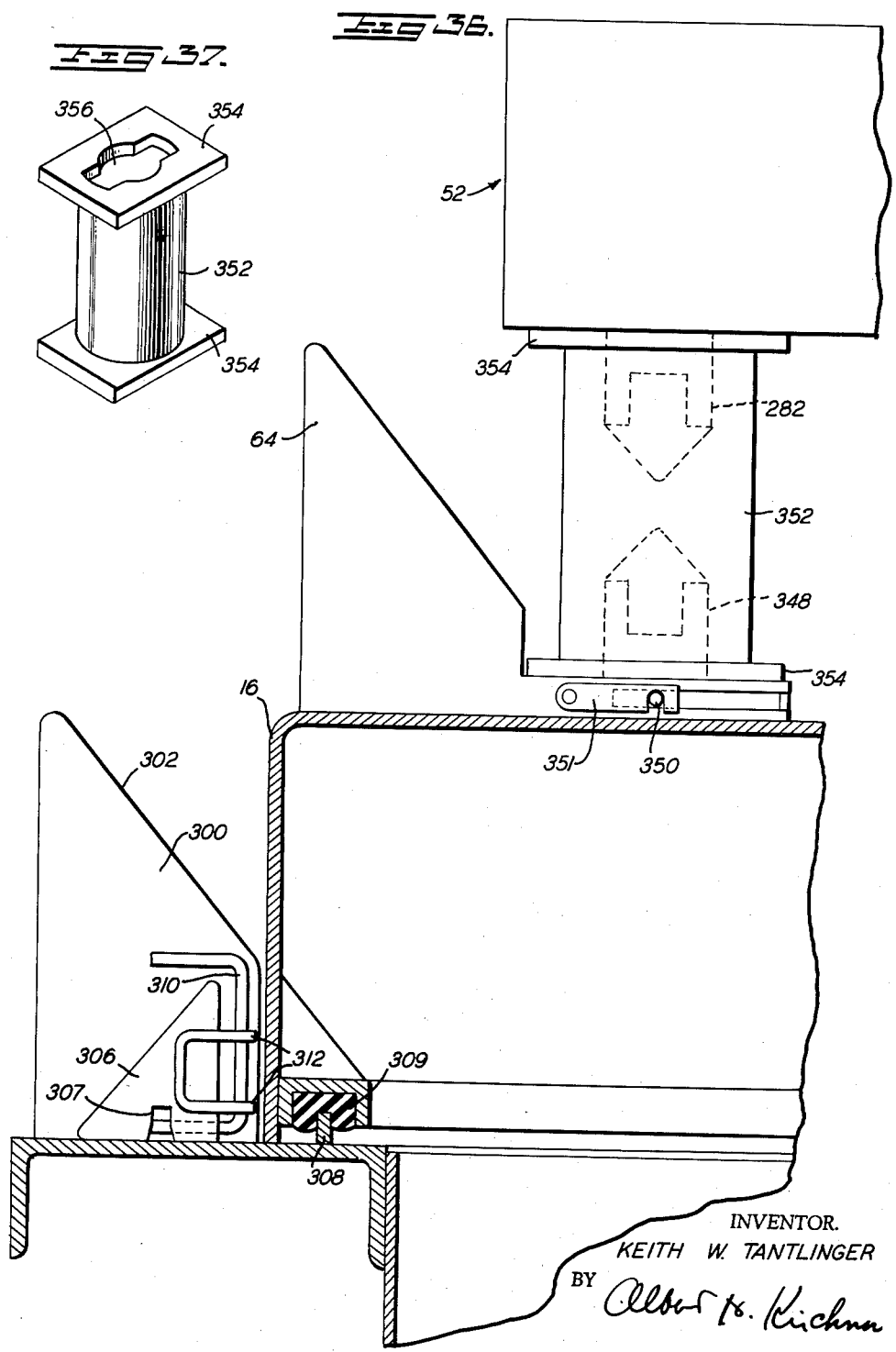
INVENTOR.
KEITH W. TANTLINGER
BY Albert H. Kirchner July 3, 1962 K. W. TANTLINGER 3,042,227
SHIPBOARD FREIGHT CONTAINER TRANSFERRING APPARATUS
Filed Sept. 26, 1958 30 Sheets-Sheet 27
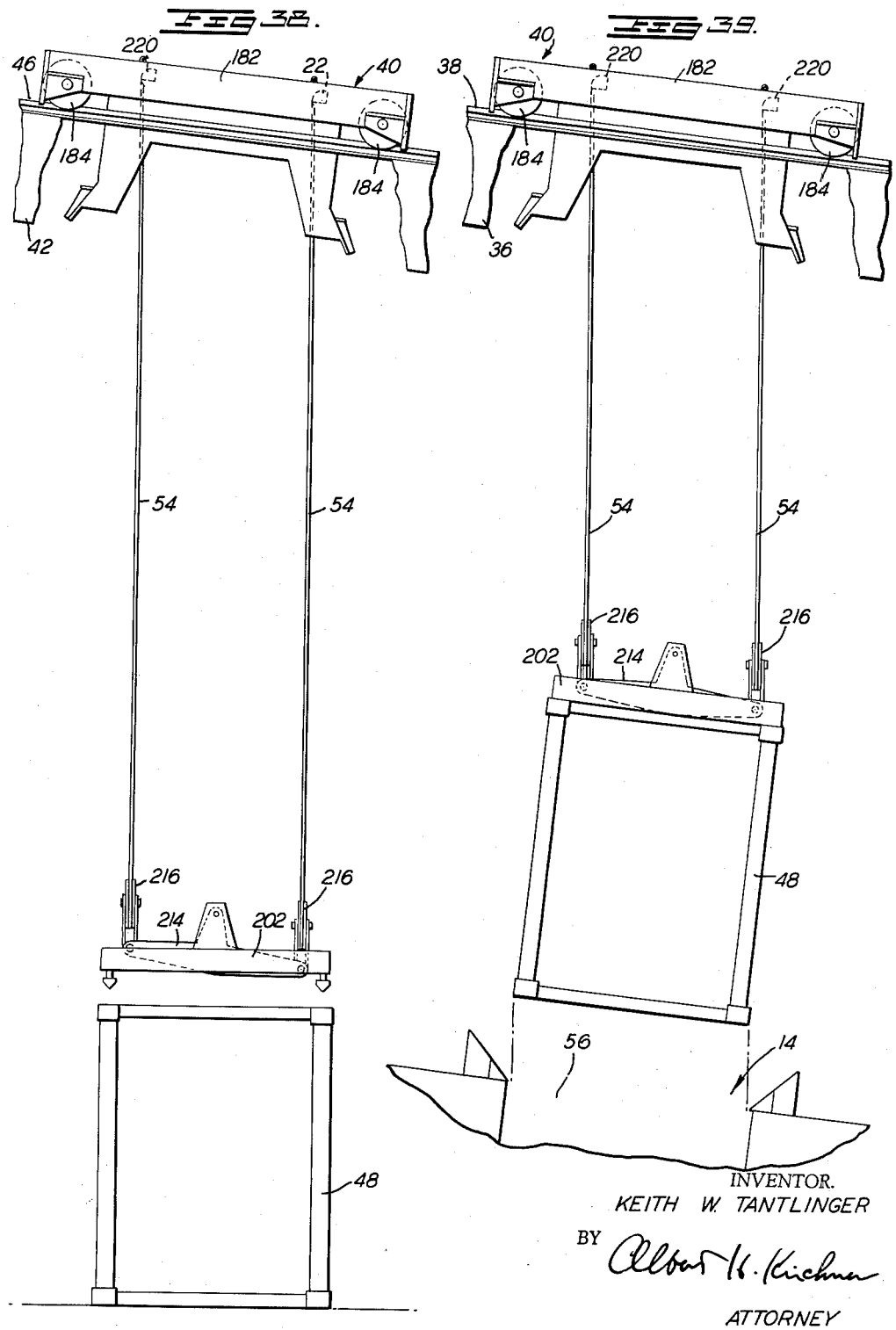
INVENTOR.
KEITH W. TANTLINGER
BY
ATTORNEY

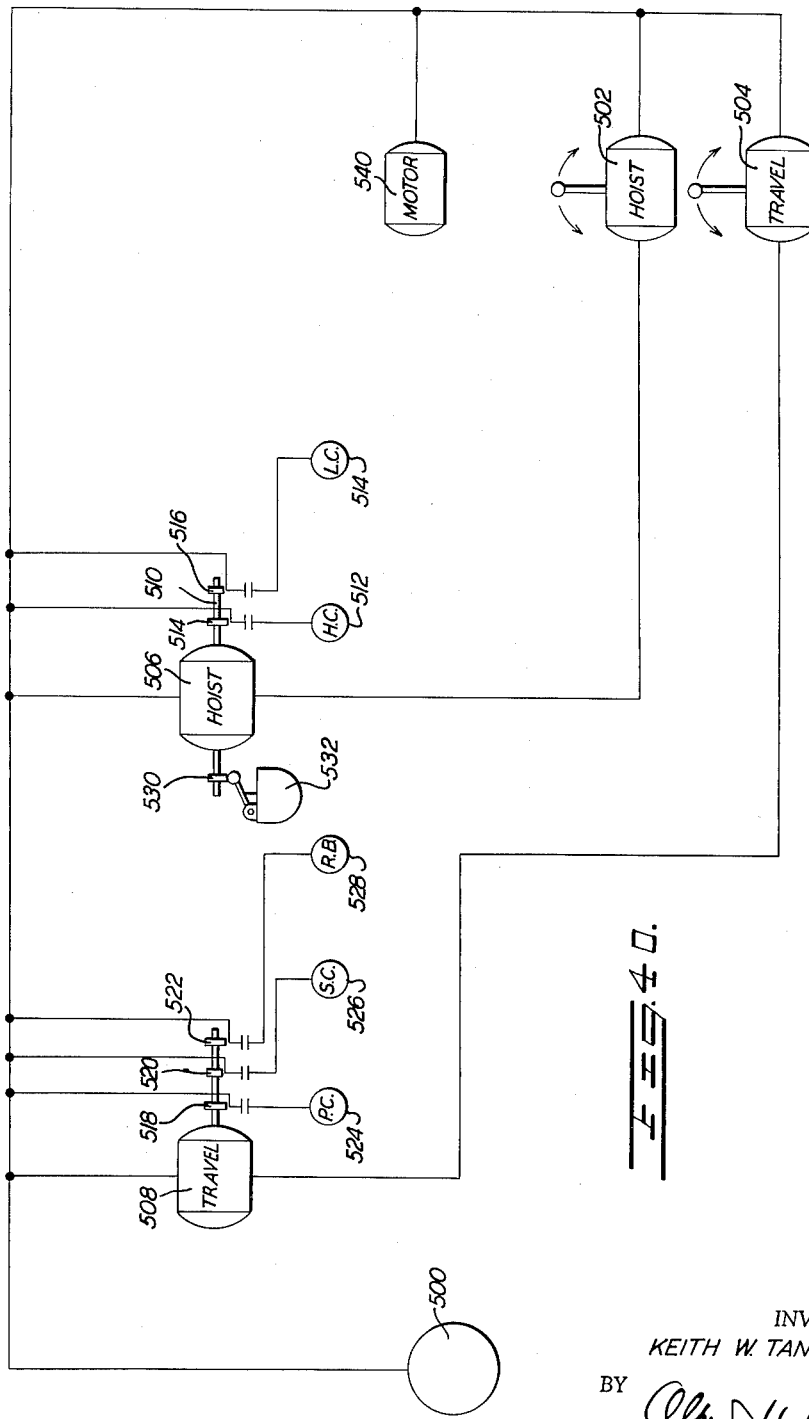

INVENTOR.
KEITH W. TANTLINGER
BY Albert K. Kirchner
ATTORNEY

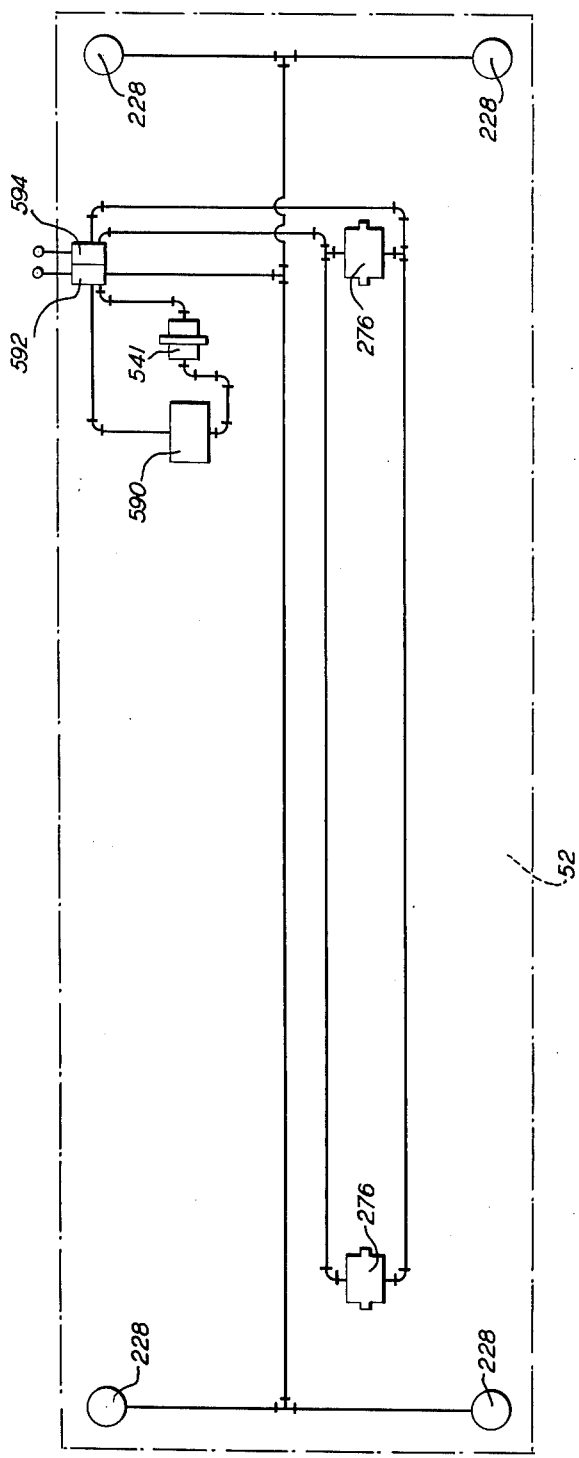

United States Patent Office 3,042,227
Patented July 3, 1962

3,042,227
SHIPBOARD FREIGHT CONTAINER
TRANSFERRING APPARATUS
Keith W. Tantlinger, Grosse Pointe Shores, Mich., assignor to Sea-Land Service, Inc., a corporation of Delaware
Filed Sept. 26, 1958, Ser. No. 763,739
24 Claims. (Cl. 214—15)

The present invention relates to ship constructions, especially a shipboard freight container transferring apparatus, and more particularly to a novel combination of gantry crane, traveling bridge, hoisting spreader, hatchway and related structure, as well as improvements and innovations in various sub-combinations and in the individual components thereof, and more particularly it provides certain apparatus for handling freight in transit involving combined, successive shipment by water and hauling by land vehicles, such as rail cars or highway trailer trucks.

The invention is directed particularly to the marine transportation component of the apparatus for handling freight in transit which forms the subject of my copending application Serial No. 727,165, filed April 8, 1958, now Patent No. 3,027,025, issued March 27, 1962, and constitutes improvements and amplifications of the ship's structure disclosed in my copending application Serial No. 682,512, Marine Freight Handling Apparatus, filed September 6, 1957.

The principal objects of the invention are concerned with facilitating the transfer of large freight containers, such as the detachable bodies of highway truck trailers, fully loaded, between a land vehicle on dockside and stowed position in or on shipboard, and the principal features of the invention are aimed at providing new structure and novel method steps for making such transfer rapidly, economically and with simplicity of apparatus and operating controls, under all the conditions of operation peculiar to the handling of oceangoing vessels, including particulraly the problems consequent upon listing, pitch, rolling and other movement or relative position of the ship and shore facilities during loading or unloading.

Among the important features of the invention, by which it is believed to be distinguished from conventional marine construction, as well as from the numerous special arrangements heretofore proposed in the patented and other prior art, are the provision of a special cell structure in the hatchways of the ship for receiving stacks of vertically superposed containers, means for mounting such containers also on the weather deck or on the hatch covers, a traveling gantry movable fore and aft along the ship, a traveling bridge mounted on the gantry and movable thereon athwart the ship for positioning over a selected wharf space or deck or hatch cover space, or cellular space within the hatchway, to or from which a container is to be moved, and hoisting means, in the form of a "spreader," depending from the bridge and equipped for making quick coupling and uncoupling engagement with container bodies to lift and lower them between the shore and ship facilities with secure fixation to the bridge during movement on the gantry, laterally of the ship, between terminal pick-up and deposit positions, so that the transfer is made without swinging of the suspended load, without the delays consequent upon waiting for such swinging movements to cease, such as were inherent in the prior art apparatus, and with complete unconcern for variations of either of the terminal positions from the horizontal and for movement of the ship resulting from unequal distribution of the cargo, or for any other reason.

Other objects and advantages of the invention will sufficiently appear to those skilled in the art from the description that will now be given of a preferred form of embodiment that has given satisfactory service in actual use, which is illustrated in the drawings and which will be hereinafter defined by the appended claims. But this particular embodiment is selected to be illustrative merely of the principles of the invention, which are not to be regarded as confined to the individual arrangements shown in the drawing and described in the specification, but which are to be considered as circumscribed only by the state of the prior art and the expressly stated limitations of the broader of the appended claims.

In the drawings,

FIG. 3 is a side elevation of the gantry structure.

FIG. 4 is a relatively enlarged fragmentary side elevation of one end portion of the gantry showing the jib in eleavted or operative position.

FIG. 5 is a side elevation of the gantry showing the jib in an intermediate position.

FIG. 6 is a top plan view of FIG. 4.

FIG. 7 is a bottom plan view of FIG. 4.

FIG. 8 is an enlarged fragmentary detail view, partly in cross section, of a portion of FIG. 7.

FIG. 9 is an enlarged fragmentary transverse section taken along the line 9—9 of FIG. 6.

FIG. 10 is a top plan view of the forward portion of the ship's hull showing the gantry driving means.

FIG. 11 is a transverse section taken along the line 11—11 of FIG. 10.

FIG. 12 is an enlarged detail section taken along the line 12—12 of FIG. 10.

FIG. 13 is a front elevation of a portion of the gantry showing the bridge and spreader in side elevation.

FIG. 14 is a side elevation taken on the line 14—14 of FIG. 13 showing portions of the gantry in cross section.

FIG. 15 is a top plan view of the traveling bridge, superimposed on portions of the transverse box girders of the gantry.

FIG. 16 is a horizontal sectional view taken on the line 16—16 of FIG. 14 showing the spreader in plan.

FIG. 17 is an enlarged fragmentary plan view of one end portion of the spreader.

FIG. 18 is a transverse vertical sectional view taken on the line 18—18 of FIG. 17 through the spreader.

FIG. 19 is a transverse vertical sectional view taken on the line 19—19 of FIG. 17 in one end portion of the spreader.

FIG. 20 is an enlarged detail vertical sectional view taken on the line 20—20 of FIG. 18.

FIG. 21 is an enlarged detail vertical sectional view taken on the line 21—21 of FIG. 17.

FIG. 24 is an enlarged vertical sectional view taken on the line 24—24 of FIG. 22 showing the driving means for the bridge crane.

FIG. 25 is a top plan view of the parts shown in FIG. 24, with the cover removed.

FIG. 26 is a schematic expanded perspective view of the entire driving means for the bridge crane travel and the raising and lowering of the spreader.

FIG. 27 is a plan view of a hatchway showing particularly the guide means for the containers.

FIG. 28 is an elevational view taken on the line 28—28 of FIG. 27 showing one of the swingable intermediate guide elements.

FIG. 29 is an enlarged detail sectional view taken on the line 29—29 of FIG. 27 showing one of the fixed guide elements at an outboard corner of the hatchway.

FIG. 30 is a top plan view of the guide means shown in FIG. 29.

FIG. 31 is an enlarged detail sectional view taken along the line 31—31 of FIG. 27 showing the guide means at the center line of the ship mounted on the coaming common to two laterally adjacent hatchways.

FIG. 32 is a top plan view of the guide means shown in FIG. 31.

FIG. 34 is a perspective view of one of the corner guide means and the locking means therefor mounted on a hatch cover.

FIG. 35 is a perspective view of an intermediate guide means and the locking means therefor mounted on a hatch cover.

FIG. 36 is a sectional view taken on the line 36—36 of FIG. 27, showing however the hatch cover and an adapter connecting it to the spreader.

FIG. 37 is a perspective view of the adapter shown in FIG. 36.

FIGS. 38 and 39 are diagrammatic views illustrating the operation of the apparatus in transferring a container between dockside and a listing ship.

FIG. 40 is a diagrammatic view of a simplified electrical control system suitable for use with the apparatus.

FIG. 42 is a diagrammatic showing of a simplified hydraulic control system suitable for use with the apparatus.

As will now be explained, these figures illustrate, in one preferred form of embodiment, the combination, on shipboard, of a fore and aft traveling gantry, on which is mounted a laterally movable bridge, from which is suspended a vertically movable spreader structure adapted to lift and lower container bodies successively from and to a highway truck chassis on dockside and into and out of hatchways and onto and from the hatch covers and deck of a ship.

Figure 1:
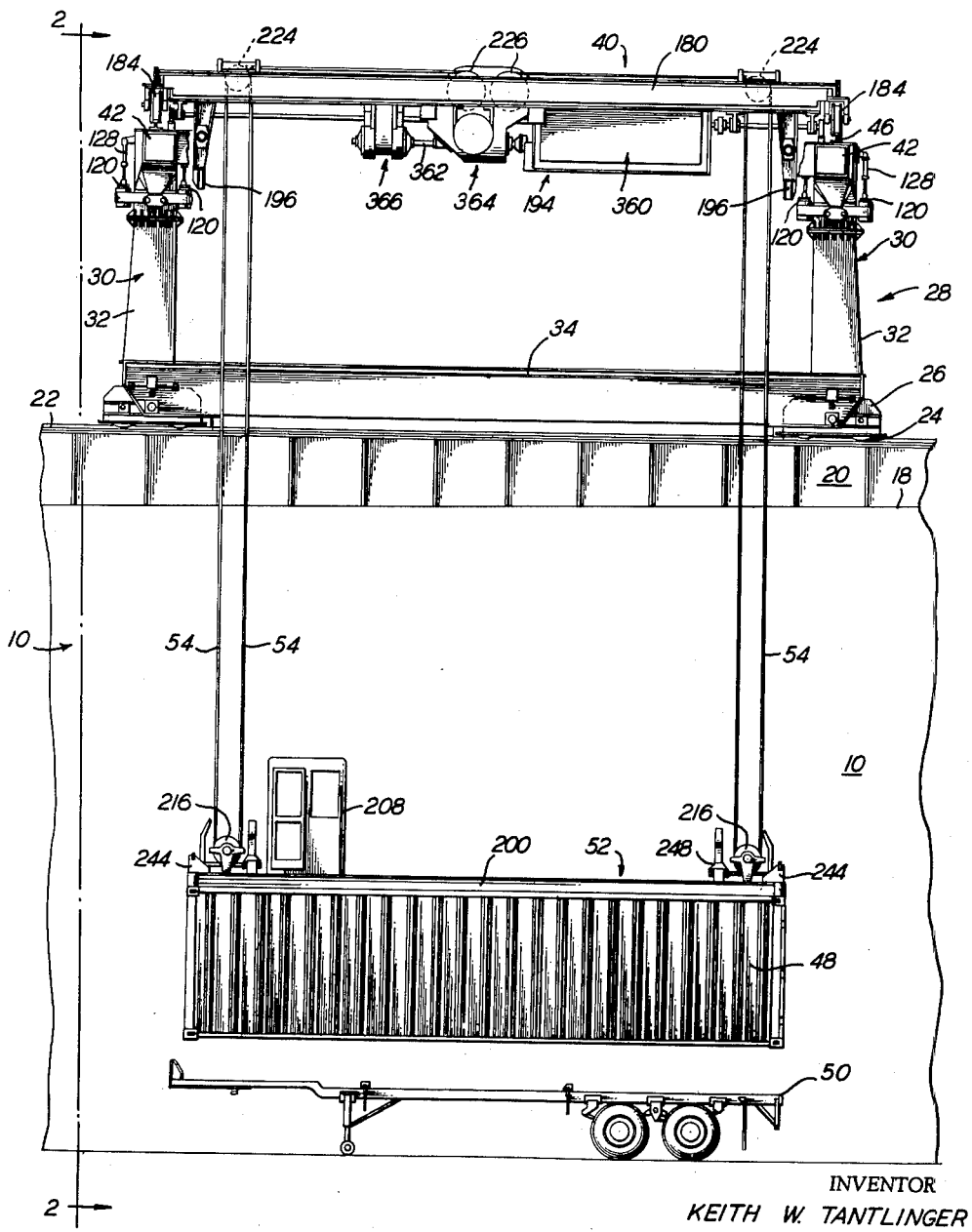
FIGURE 1 is a side elevation of a portion of a ship's hull showing the gantry bridge and spreader frame in operative position on a box.
Figure 2:
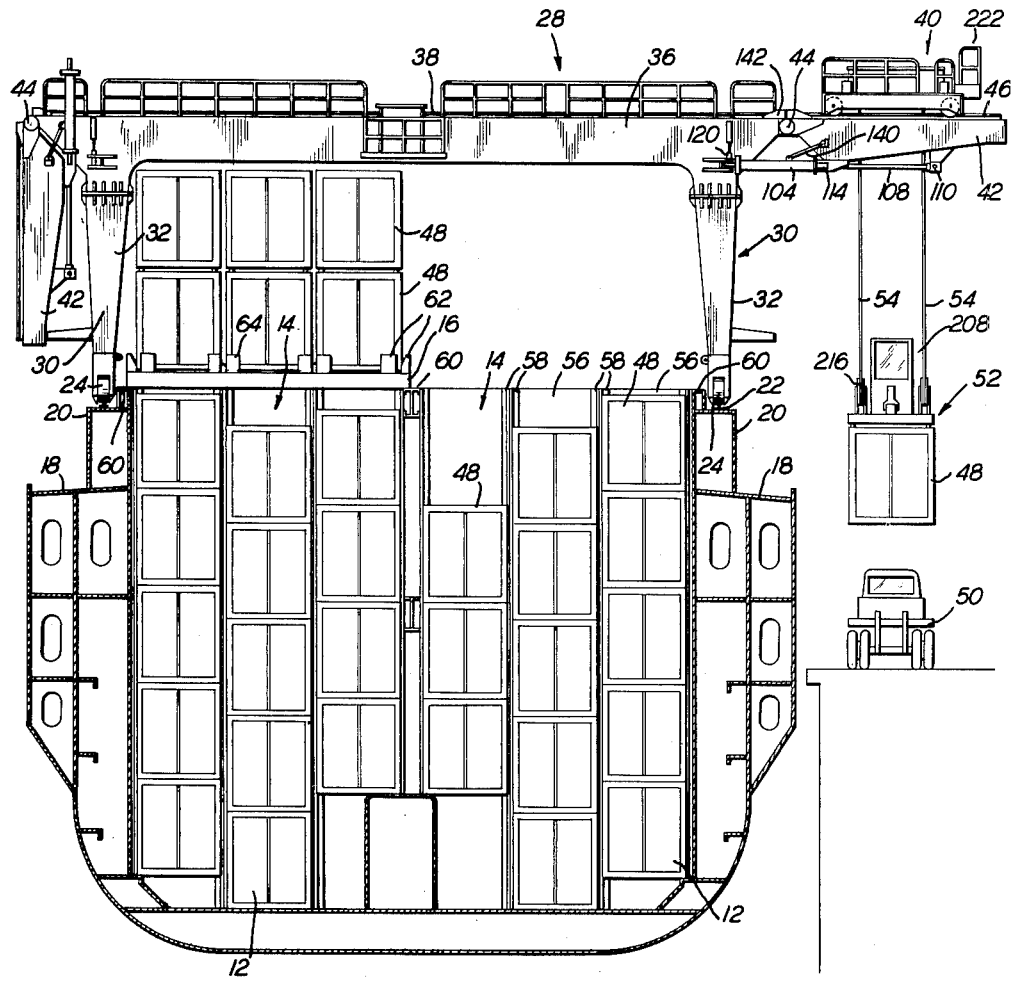
FIG. 2 is a transverse vertical section taken on the line 2—2 of FIG. 1 through the hull showing the parts in the position of FIG. 1, with the gantry in side elevation.
Figure 41:
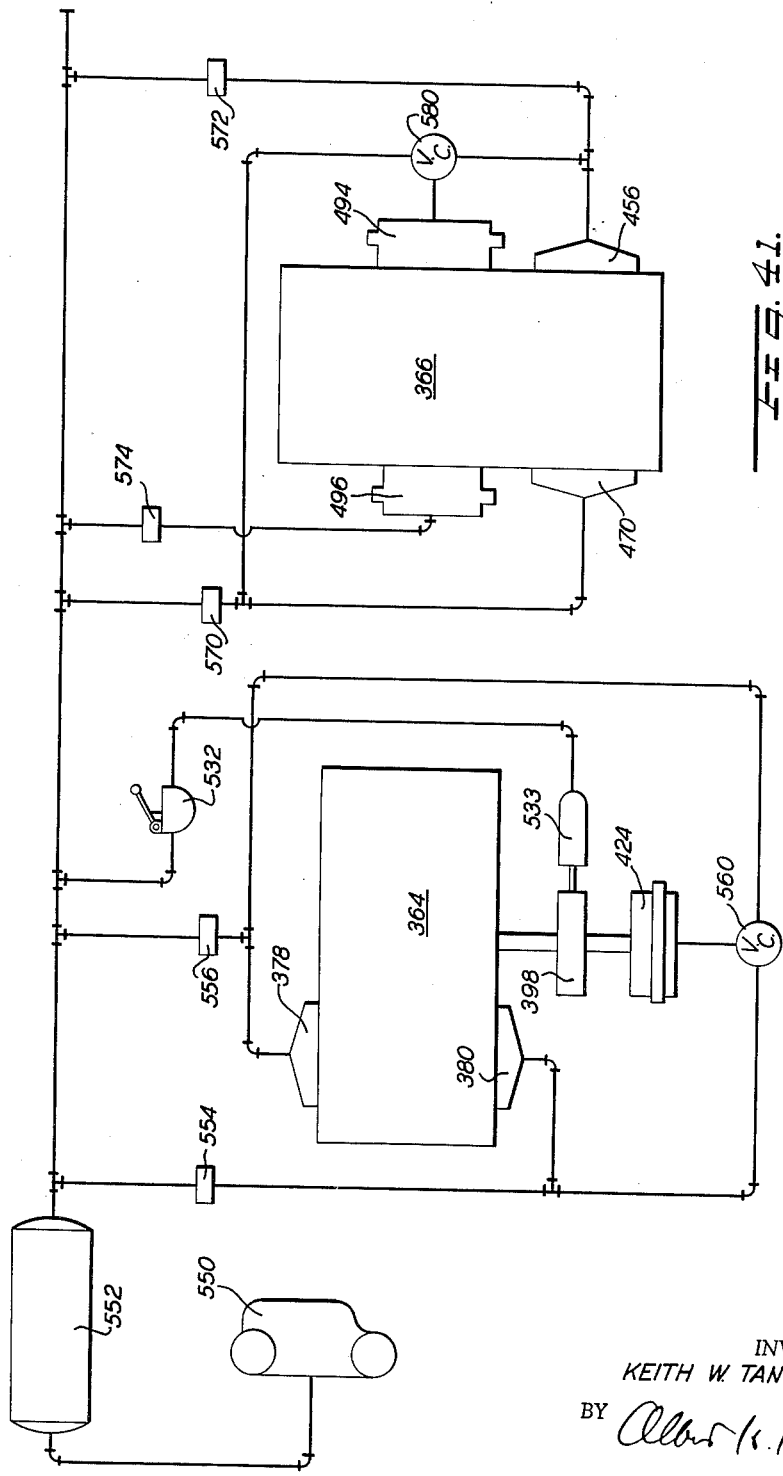
FIG. 41 is a diagrammatic showing of a simplified air control system suitable for use with the apparatus.

In these drawings FIGS. 1 and 2 show this general combination; the gantry per se is shown by FIGS. 3-9; FIGS. 10-12 illustrate the gantry drive mechanism; FIGS. 13 and 14 show the combination of bridge and spreader; FIG. 15 is a general view of the bridge; FIGS. 16-21 illustrate the details of the spreader structure; FIGS. 22-26 illustrate the mechanism mounted on the bridge for operating the bridge and spreader; FIGS. 27-37 show details of the arrangements for guiding the containers into position on the hatch covers and for entry into the hatches; FIG. 38 shows diagrammatically how the apparatus permits the container to be suspended over and deposited on a level dock surface, being properly positioned normal to such surface by gravity; FIG. 39 shows diagrammatically how the apparatus accommodates itself automatically to the list of a ship being loaded or unloaded, so that the relationship between container and shipboard stowage surface, e.g., hatchway cell guide angles, is automatically perfected to effect ease of entry and removal with complete freedom from binding, wedging or chattering during descent or withdrawal of the container; and FIGS. 40-42 show schematically certain mutually cooperating simplified operating control systems for the bridge and spreader.

In these figures:

The reference numeral 10 designates generally the ship, i.e., a cargo-carrying marine vessel having a number of holds 12, each accessible through a hatchway 14 surmounted by a removable cover 16 on a weather deck 18. Rail supports 20 are built on the deck, extending in straight lines and a single plane fore and aft along both outer margins of the deck. On these supports are mounted rails 22 to provide runways for the wheels 24 of trucks 26 of a traveling gantry 28.

The gantry 28 comprises generally a pair of laterally spaced identical side structures 30 of upright U-shape, each comprising a pair of columns 32 spaced fore and aft and connected at their lower ends by a lower longitudinal beam 34 supported on a pair of the trucks 26. The upper ends of the two forward columns 32 are connected by an upper cross beam 36, and the upper ends of the two aft columns 32 are similarly connected by an identical upper cross beam 36. Mounted on the two cross beams 36 are rails 38 providing a runway for the transversely traveling bridge 40.

The upper cross beams 36 terminate in substantially the plane of the ship's sides and are made extensible by jibs 42 hinged at 44 to the outer ends of the beams. The jibs carry extension rails 46 which become aligned with the rails 38 when the jibs are in elevated, operative position as shown at the righthand side of FIG. 2, so that the traveling bridge 40, hereinafter to be described more in detail, can be run out on the jibs to a point beyond the ship's side, as also shown at the righthand side of FIG. 2, to raise and lower one of the containers 48 from and to cooperating base or surface on shore, such as a highway truck trailer chassis 50 which has been run onto the pier or wharf at which the ship is docked.

To make connection with the containers 48 the bridge suspends a spreader 52 hung from cables 54 which, when raised, moves with the bridge between the point over dockside, shown at the righthand side of FIG. 2, laterally of the ship, as shown in broken lines in FIG. 13, and a point over one of the hatchways 14, where the spreader moves vertically to lower the container into the hatch or onto a hatch cover or lift it therefrom.

While the ship's hull may be constructed in any of numerous specific ways to contain the containers 48, a preferred type of construction is shown in the drawings, particularly FIG. 2. As there shown, each of the hatchways 14 is formed with three cells 56 arranged side by side and each rectangular in plan and defined by four corner angles 58 extending from top to bottom of the hold. Each of these cells is proportioned to receive in sliding fit a stack of superposed containers 48. The covers 16 for the hatchways are secured to coamings 60, and each cover is constructed to support one or two tiers of containers 48. For this purpose each of the covers is provided with a pair of guide chocks 62 right angularly arranged at its corners and intermediate guide chocks 64, as shown in FIG. 2, the chocks all being substantially similar and each being made upwardly flaring by being provided with an inner surface that slopes inwardly and downwardly to make contact with the bottom fitttings of the corner posts of a container being lowered, as explained in my copending application Serial No. 727,165, so as to position the container on the cover. These positioning means, and their appurtenant fixtures for securing the containers in position on the hatch covers, will be described more in detail hereinafter.

Paralleling the rail 38 on each upper cross beam 36 of the gantry is a rack 100, and an extension rack 102 is provided on each jib, so that when the jibs are elevated the two sections of each rail and of each rack will be respectively aligned. To operate the jibs between the elevated, operative position shown in FIG. 4 and the fully stowed or retracted position shown at the lefthand side of FIG. 2, through the intermediate position show nin FIG. 5, each of the jibs is provided with the mechanism seen in FIGS. 3-8. This comprises a jib-extending cylinder 104 pivoted at 106 to an end portion of the underside of the upper cross beam 36, from which is extensible and retractible a piston rod 108 which has its outer end pivoted at 110 to the underside of the outboard end portion of the jib 42. When the jib is raised into the operative position shown in FIG. 4, a pair of struts 112 become operative to hold the jib in that position. Each strut 112 comprises a bar which has one end pivoted at 114 to the inboard end of the jib and has an eye 116 at its other end which registers with the two openings in a strut clevis 118 when the jib is elevated and the strut is swung about its pivot 114. In this position the strut may be fixed in position in the clevis by insertion of a strut pin 120. The strut is operated in the necessary swinging arc of some fifteen degrees more or less by a fluid pressure cylinder 122 mounted on the underside of the jib near its inboard end working a piston rod 124 pivoted to an arm 126 radially extending from the strut 112 in its pivot axis.

The pin 120 is actuated by a fluid pressure cylinder 128 through the aligned clevis and eye when the jib is elevated and the strut is in position. In this disposition of the jibs the rail and rack sections are aligned and abutted, respectively, as seen in FIG. 6, for movement of the traveling bridge 40 to the extreme outboard position shown at the righthand side of FIG. 2, for example.

When the jib is moved through the intermediate position of FIG. 5 to the fully stowed position shown at the lefthand side of FIG. 2, an abutment surface 130 formed on the pivot fixture 110 engages a pad 132 extended from the lower beam 34, and at the same time the strut 112 becomes received in stowage clamp 134 on the upper cross beam of the gantry. In the retracted or stowed position of the jibs they may be fixed, when the vessel is at sea, by means of pad eyes 136 formed on the lower beam 34 and an eye 138 on the pivot fixture 110 which may be lashed together in any suitable manner.

The heavy strut 104 may be supported for its swinging movement by a strut brace 140 which is pivotally mounted on the inboard end portion of the jib 42 and clamped at its other end to the strut. Upstops 142 may be provided on the upper surface of the jib and upper cross beam to come into cooperative engagement to limit the jib in its upper, operative position, as shown in FIGS. 4–6.

The rail and the rack may be mounted in position by clamps 144 and 146 respectively, as best shown in FIGS. 6 and 9. The two jibs at each gantry side structure 30 have their outboard ends rigidly connected by a stout longitudinal beam 148.

The trucks 26 which mount the gantry side frames 30 on the deck rails 22 are provided in pairs, one at each longitudinal end of each side frame. Each truck has two flanged wheels 24. Secure connection of the gantry to the rails, under all conditions of rolling, pitching and listing of the ship, and under possible abnormal conditions, is assured by sliding rail clamps 150 carried by the underside of the longitudinal beam 34 and engaged over the rail ball, as seen in FIG. 3. The clamps are primarily provided as a safety feature precautionary against displacement of the gantry by abnormal loads that might be imposed on the bridge under some extraordinary conditions, e.g., lifting effort applied to a container immovably anchored to the dock.

As shown in FIGS. 3, 10, 11 and 12, the gantry is propelled fore and aft along the rails by a cable 152 connected to each side frame 30. Each cable has its opposite ends secured to the side frame at connections on the underside of the longitudinal beam 34. From one of the connections, designated 154 in FIGS. 3 and 12, the cable is trained over an idler pulley 156 journaled on a horizontal axis fixed relatively to the deck at one limit of the travel of the gantry and then extends in the opposite direction to the other limit of travel of the gantry where it is trained around a pulley 158 journaled on a vertical axis which is fixed relatively to the deck. The cable extends inwardly from this pulley and is wound in a number of turns about a drum 160 driven by a motor 162 in the center of the deck, as shown in FIG. 10. From this drum the cable extends back to a pulley 164, mounted on a vertical axis above the pulley 158, and from the pulley 164 the cable extends to the other connection to the gantry side frame, designated 166 in FIG. 3.

The cable, pulley and connection arrangement is duplicated at both sides of the gantry, and both winding drums are simultaneously driven to pull the two cables in the same direction by a common drive pinion 168 meshed with gears 170 on the two drums 160 and driven by the motor 162, all as shown in FIG. 10.

Limit bumpers 172, containing coil compression springs, may be provided at the ends of the rails 22 for cooperation with pads 174 formed on the ends of the gantry side frames, as viewed in FIGS. 10 and 12, and the gantry may be stowed at either rail end by compressing the bumper springs to solid condition by the use of heavy turnbuckle-type devices called "steamboat jacks," then deactivating the bumper springs by inserting pins diametrically through their casings, and then lashing together the brackets 176 formed on the adjacent surfaces of the gantry and rail end.

The traveling bridge 40 comprises a rectangular open framework made up of longitudinal members 180 and cross members 182. A pair of flanged wheels 184 are journaled in each cross member 180 to support the bridge for movement on the gantry rails 46, and a pair of pinions 186 are splined on the ends of a drive shaft 188 which is journaled in bearings 190 fixed to one of the longitudinal members 180. The pinions are meshed with the two racks 102 and the shaft 188 is driven by mechanism hereinafter to be described to propel the bridge transversely of the ship, from one extended jib to the other.

Rail clamps 192, like the clamps 150, are fixed to the cross members 182 and slidably engaged with the rails 46, to insure secure connection of the wheels 184 on the rails as the bridge moves therealong under all such conditions as those previously described in connection with the description of the gantry clamps 150.

The bridge 40 carries a centrally disposed power unit designated generally 194 for driving the pinions 186 and operating the cables 54 for raising and lowering the spreader generally designated 52, as will be more fully explained and described hereinafter.

The under side of the bridge 40 is formed with downwardly and laterally outwardly flaring fixed guide arms 196 forming a generally upwardly tapering pocket adapted to be engaged by corner rollers 246 (FIG. 17) mounted on the spreader 52 so as to nest the spreader and an attached container in firm, tight metal to metal engagement of the spreader to the bridge, so that the securely connected spreader and container become virtually an integral part of the bridge during lateral movement, thus preventing swaying or relative movement between the two and permitting all lateral accelerating and decelerating forces to be absorbed through the rigid metal to metal contact between bridge and spreader, thus preventing pendulum action and over-travel between bridge and spreader, as would occur if such lateral movement took place without the two components firmly nested together. This is an important feature of the invention, as will hereinafter more clearly appear.

As shown in FIGS. 13, 14 and 16–21, the spreader 52 comprises a rectangular framework of substantially the dimensions in plan of a container body, composed of a pair of longitudinal members 200 connected at their ends to cross members 202, braced by diagonal and normal tie means 204 and containing a platform 206 which forms a convenient location for an operator's cab 208. At each end the spreader has a pair of spaced parallel beams 210 connecting the longitudinal members each provided at its center with an elevated bracket 211 which is apertured at its center to provide bearings for the sleeved trunnions 212 formed on the high boss 213 of a walking beam 214. The two walking beams are suspended from the bridge 40 by the cables 54 by means of sheaves 216 which are four in number, one being secured pivotally to each end of each walking beam, as at 218. Each of the four cables is trained around one of the sheaves. As shown in FIG. 13, the free ends of the two cables at each side of the spreader are extended up to the bridge and trained around grooved guide blocks 220, 220, welded on the bridge directly above the respective sheaves 216, and anchored on one of the longitudinal beams 200 of the bridge conveniently accessible from a catwalk 222 provided along that beam. The anchorage may be by means of adjusting devices (not shown) which can be readily regulated from the catwalk to adjust cable lengths to compensate for different degrees of initial stretch in the individual cables.

The brackets 211 are considerably elevated above the top surface of the spreader, and the adjacent walking beam is provided with a correspondingly high boss 213, so that the pivot axis from which the spreader is hung on the beams will be well above the center of gravity of the spreader when empty, i.e., uncoupled to a container. Thus the spreader tends to hang level (even when unstayed by release of the tilt lock cylinders shown at 228 and hereinafter described).

From the sheaves 214 the cables 54 extend up to sheaves 224 (four in number) on the bridge and thence each to an anchorage on one of the four winding drums 226, best shown in FIGS. 14 and 15, which form part of the power unit 194 in the center of the bridge. Thus the plane of the two walking beams is maintained at all times parallel to the plane of the bridge frame, the two cables at each end being always of the same effective length. However, it is desirable that the spreader be movable from a horizontal plane when supporting a container 48 over a chassis on the dock, for lifting from the chassis or lowering onto the chassis, so as to make or break connection to or from the four socketed fittings simultaneously, as disclosed in my copending application Serial No. 727,165, to an inclined plane corresponding to the list of the ship so as to fit properly into the hatchway cells, which of course are inclined at exactly the same degree of list. To accomplish this transition from horizontal to inclined position (on loading) and from inclined to horizontal (on unloading), the spreader is suspended from the walking beams by the trunnions 212 as heretofore explained, and the piston and cylinder connections shown in FIGS. 17, 18 and 20 are provided.

As shown in these figures, two hydraulic tilt lock cylinders 228 are mounted at opposite ends of each of the beams 210 of the spreader, each over one end portion of the adjacent walking beam 214, and each contains a piston 230 which bears on the walking beam under pressure introduced into the cylinder through a line 232.

With this arrangement, assuming the ship is listing to dockside and the bridge is run out on the gantry jibs over a container body resting on a chassis on the wharf, the spreader will be lowered in a horizontal plane to make simultaneous engagement of its four corner twist lugs (hereinafter to be described) with the four socketed top corner post fittings of the container. The spreader will then rise, maintaining its horizontal plane. However, the plane of the two walking beams will be inclined, being parallel to that of the bridge, which corresponds to the list of the ship. When the spreader reaches the upper limit of its movement and becomes secured in the bridge, i.e., enclosed within the pocket formed by the guide means 196, it must be parallel to the bridge, which means parallel to the walking beams. When the spreader is lowered over a hatch cell 56, or onto a hatch cover 16, it assumes the list of the ship so that the four socketed fittings at the corners of the container engage the corners of the cell opening simultaneously or engage the guide chocks 62 and 64 on the hatch cover simultaneously. This is accomplished by the apparatus shown in FIGS. 16, 17, 18 and 20 operated by the controls shown in FIGS. 40–42, all to be hereinafter described in detail.

Details of the spreader include a pair of right-angularly arranged brackets 244 at each corner, with a roller 246 journaled in each bracket. These eight rollers thus define an outline of rectangular shape of slightly greater dimensions than those of the plan of the spreader. The rollers engage the guide means 196 as the spreader rises into the pocket in the bridge defined by the vertex of the angle formed by each of the guide means 196.

In order to center the spreader on a container on to which it is being lowered, the spreader is provided with three flipper assemblies at each end portion thereof. Each flipper assembly, designated 248, comprises an arm 250 of special flaring shape as best shown in FIG. 19, which freely hangs from a pivot shaft 252 on the ends of a pair of parallel cranks 254 fast on the ends of a stub shaft 256 journaled in a housing 258 mounted on the spreader (four on each longitudinal beam 200, and two on each cross beam 202, as shown in FIGS. 16 and 17). Each of the cranks 254 is widened and pivotally carries a rod 260 at a point 262 circumferentially spaced from the pivot shaft axis 252. A compression spring 264 is fitted over the rod and reacts in tension between an adjustable nut abutment on the end of the rod and an abutment on the flaring arm 250. A downwardly facing hook 266 is formed on the inner face of the arm for engagement with a keeper 268 on the adjacent surface of the frame member of the spreader.

A bevel gear 270 is keyed to the shaft 256 which is driven by a bevel gear 272 keyed on a drive shaft 274. There are three such drive shafts at each end portion of the spreader, as best shown in FIG. 17. A hydro-motor 276 drives the three shafts. The two aligned shafts 274 drive the right-angularly directed shaft 274 by a pair of bevel gears 278 in a gear box 280, as shown in FIG. 17.

The arrangement is such that when the hydro-motor 276 is operated to rotate the shafts 274 in one direction the arms 250 swing from the broken line position of FIG. 19 down toward the full line position. Before the arms reach the full line position of FIG. 19, the hooks 266 engage the spreader frame members above the keepers 268. Further rotation of the shafts 274 forces the hooks down onto the keepers, compressing the springs 264. By virtue of the springs, therefore, all the arms are snugly engaged with the spreader frame, with the hooks engaged with the keepers, even though the shafts 274 may not rotate equally.

With the arms 250 hooked in the full line position shown in FIG. 19, the spreader, descending on a container 48, will be centered by the flare of the arms, so as to align the twist lugs 282 with the socketed fittings at the upper ends of the corner posts, as explained in the copending application, Serial No. 727,165.

The twist lugs 282, inserted in the container sockets, are then rotated by the mechanism best shown in FIG. 21. This comprises a crank arm 284 fast on the upper end of each lug which is pivoted to the end of a rod 286 extending from a rod 288, which is preferably actuated manually from the cab 208 by the operator of the system, although hydraulic cylinder operation could readily be provided.

In operation of the system, the gantry is positioned appropriately along the length of the ship so that the bridge can be moved laterally between a point over a hatchway cell, for example (or over a hatch cover) and a point on a wharf occupied by a chassis, so that a series of containers can be moved from a succession of chassis to shipboard or vice versa.

With the gantry thus positioned, the bridge is moved laterally of the ship, along the gantry, and the spreader is operated, by the mechanism shown in FIGS. 22–25 and diagrammatically in FIG. 26, hereinafter to be described in detail.

To guide the descending container into a cell, or onto a hatch cover, the devices and arrangements shown in FIGS. 27–36 are provided. As shown in FIG. 27, the coaming 60 of a hatch 14 provided with three cells 56, has at each of its two outboard corners a pair of right angularly arranged guide chocks 300 shown in detail in FIGS. 29 and 30. Each of these is a casting having a beveled inner face 302 terminating short of the inner edge of the coaming in a vertical wall 304, combined with a supplemental chock 306 which completes the slope that terminates in one of the planes of the adjacent corner angle 58. The supplemental chock is movably connected to the chock 300 by a hinging arrangement permitting the supplemental chock to be lifted off the coaming and swung laterally to inoperative position as shown in FIG. 36 to permit the hatch cover 16 to be properly oriented and subsequently horizontally restrained on the coaming. The supplemental chock may be slotted, as shown at 307, to accommodate the sealing rib 308 which is provided on the coaming normally to be engaged by the weatherstripping 309 of the hatch cover. A satisfactory hinge is provided by a pin 310 mounted on the chock 300 penetrating a pair of aligned eyes in a fixture 312 on the supplemental chock, as best shown in FIGS. 29, 30 and 36.

Similar chocks and supplemental chocks are provided in alignment along the forward and aft coamings, one at each corner of each of the cells 56, as shown at 314 in FIG. 27. These guide a descending container in a fore and aft direction into the cells. To guide the container in a lateral direction into the center cell, and to cooperate with one of the corner chocks 300 in guiding a container into an outer cell, a "flip-flop" guide arm 316, best shown in FIG. 28, is pivotally mounted on the intersection of the inner side of each outer cell and the outer side of the inner cell, so as to function for the two adjacent cells to provide a flaring or "funnel" type entry without wasting space between cells, all three cells. This arm is pivoted at its base, as shown at 318, to a bracket 320 fixed between the instanding flanges of the two angles 38 that form parts, respectively, of the center cell and the adjacent side cell.

The free end of each arm 316 is pivoted to a depending brace or strut 322 whose lower end is adapted to be received and supported in either one of two identical bearings 324, each secured to an end wall of the hatch, adjacent to the juncture of the center and side cells, as seen in FIG. 27. This arrangement permits each of the arms 316 to be set in the full line position of FIG. 28 to cooperate with the other guide means heretofore described in directing a container into its cell, and to be swung to the broken line position at the right of FIG. 28 to perform this same function relative to the adjacent cell. Each of the arms 316 may be stowed in inoperative position, as shown in broken lines at the lefthand side of FIG. 28 with the strut 322 extended in alignment with the arm and resting on a pad 326 mounted on the hatchway wall, so as not to interfere with installation of the flat hatch covers 16.

The inboard side of each hatchway (of a deck having two laterally juxtaposed hatchways as shown in the illustrated embodiment of the invention) is provided with guide means in the form of a double beveled chock 328 at each fore and aft end of coaming, as shown in FIGS. 27, 31 and 32. Supplemental chock elements 330, two in number, are movably mounted, one on each of these chocks, like the supplemental chocks 306, for the same purpose. Manipulation of the supplemental chocks is facilitated by providing each of them with a hand hold 332 opening to the hollow interior of the casting.

With the flip-flop arms 316 in stowed position shown in broken lines at the left hand side of FIG. 28, and each of the supplemental chocks 306 and 330 swung to an out of the way position, as viewed in FIG. 36, the hatch cover 16 may be lowered into position on the coaming, during which movement of the covers the sloping faces 302 guide the cover into sealing position with the weatherstripping 309 engaged with the coaming ribs 308. In this final position of the parts the vertical walls 304 of the chocks 300 provide horizontal restraint of the hatch covers 16, and hence also of the containers superposed thereon, when the ship is at sea.

As shown in FIGS. 33–36, each of the hatch covers 16 is equipped with guide means generally similar to the coaming chocks heretofore described. At each of the four corners a member 62 is mounted, presenting a pair of rightangularly related downwardly converging sloping faces 336, with a pivotally mounted twist lug 338 positioned at the intersection of the planes of the faces. Intermediate the corners the transversely extending side margins of the cover are provided with two equally spaced sets 64 of guide members, one set being shown in FIG. 35. Each set comprises a pair of spaced, aligned elements 342, each presenting a face 344 downwardly sloping inwardly of the cover, with a double sloping member 346 in the space between the two elements. A pair of twist lugs 348, each like the twist lug 338, are mounted one on each side of the double sloping member 346.

Thus the space on each hatch cover to be occupied by a container is defined by the vertical planes at the bottoms of the respective corresponding sloping faces of the several guide members. A container, delivered to the hatch cover, is thus positioned properly into one of these spaces (three in number in the illustrated embodiment of the invention), so that each of the twist lug elements 338 and 348 will be aligned with one of the sockets formed at the bottoms of the four container corner posts, as shown in the last-named copending application. The lugs may then be rotated by manipulation of the handles 350 to lock the container in position, and keepers 351 may be provided to retain the handles in locking position.

In this finally stowed position, the vertical faces of the guide members cooperate with the twist lug elements by restraining horizontal shifting of the containers under rolling and pitching conditions of the ship at sea, so as to prevent side stresses on the elements with resulting binding and/or distortion. The tolerances in the fashioning and placement of the guide members and the lugs and their cooperating structures are all set up to insure this free rotatability of the lugs in the position of the container to which the guide members direct it.

In order to effect connection of the spreader 52 to a hatch cover 16 for moving the cover to or from operative position on the coaming, adapters 352 are provided. These are low cylindrical hollow columns having opposite end plates 354 each provided with a keyhole type socket 356 for reception of a twist lug. In use, four of these adapters are set on the four twist lugs 348 defining the space on the hatch cover provided for the central of the three containers which the cover accommodates (shown in broken lines in FIG. 33) and the handles 350 are swung to rotate the lugs some 45 degrees to lock the adapters in place. The spreader is then lowered and the twist lugs 282 on its four corners 52 are inserted into the upper sockets 356 of the adapters and rotated to complete the connection of the cover to the spreader. In a ship having two laterally juxtaposed hatchways, as in the illustrated embodiment, it is desirable to load and unload the two simultaneously, as nearly as possible, in order to reduce objectionable listing to a minimum. In such case both hatch covers can be removed and carried by the gantry fore or aft for stowing on a deck space or on top of deck-stowed containers.

FIGS. 22–26 illustrate the power and transmission for movement of the bridge and raising and lowering the spreader. The power unit 194, mounted on the bridge 40 as heretofore explained, comprises a diesel engine 360, or an equivalent electric motor, whose drive shaft 362 is coupled to a transmission unit 364 for driving the drums 226 which raise nad lower the spreader, and to a second transmission unit 366 for driving the pinions 186 which propel the bridge on the gantry.

Figure 22:
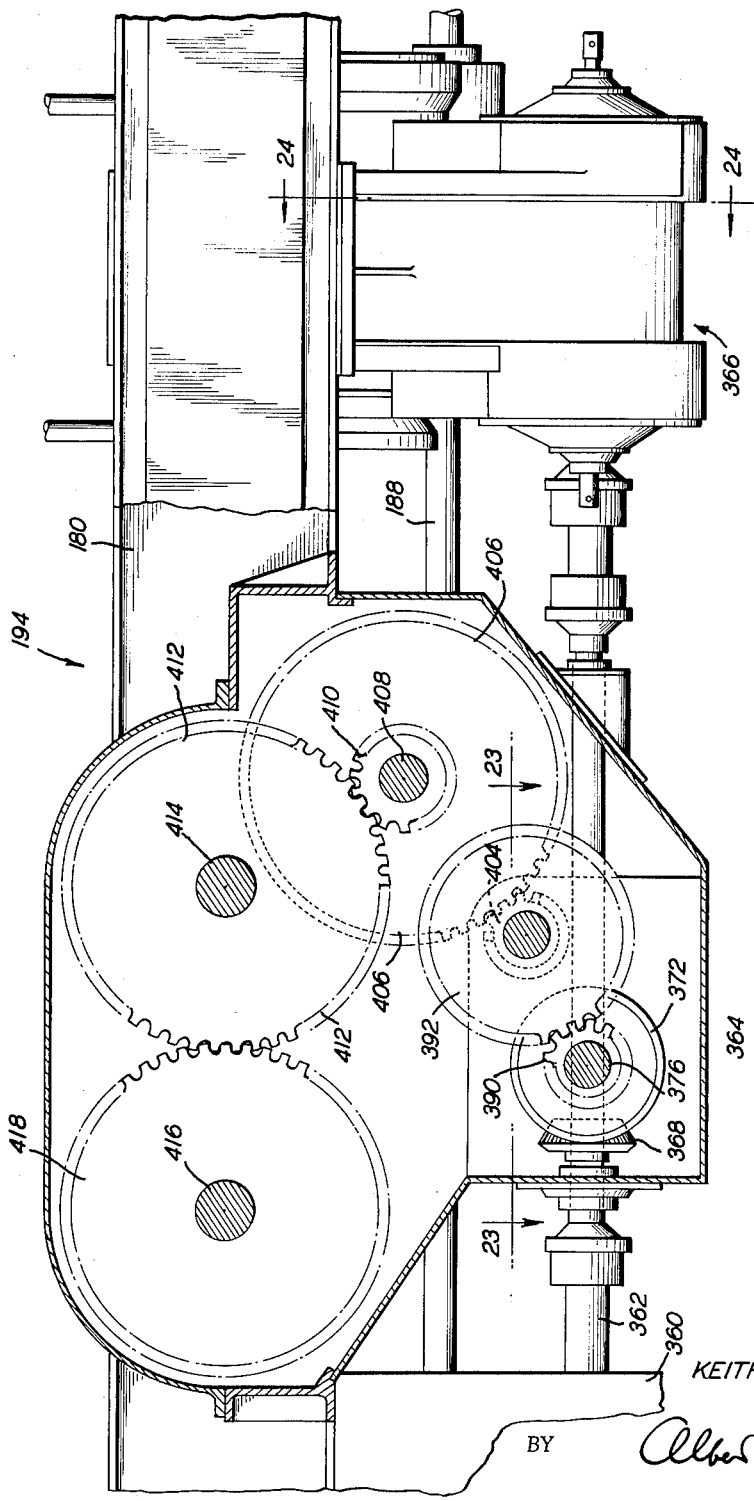
FIG. 22 is an enlarged detail vertical sectional view taken on the line 22—22 of FIG. 15 showing a portion of the driving means for lifting and lowering the spreader.
Figure 23:
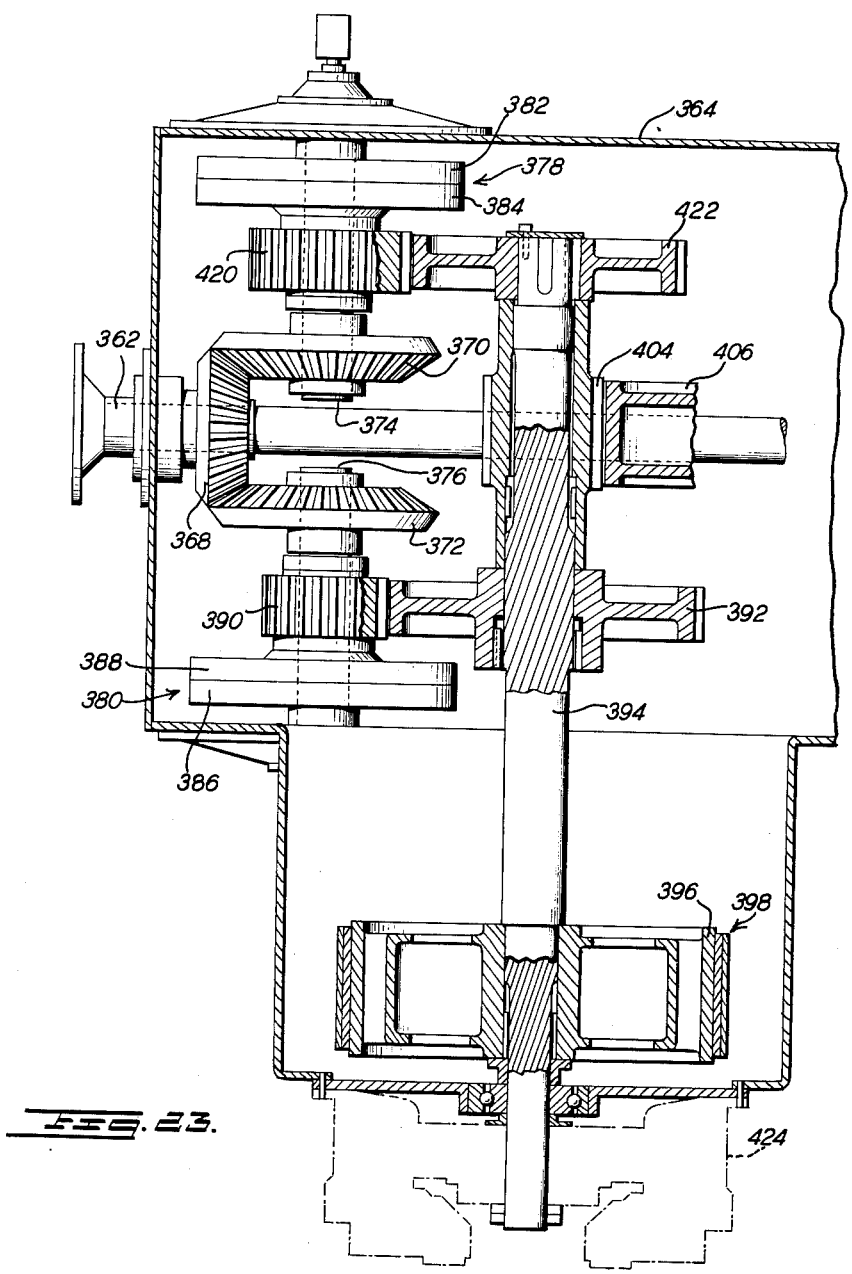
FIG. 23 is a horizontal sectional view taken on the line 23—23 of FIG. 22 showing the reversing means for the spreader drive.
Figure 33:
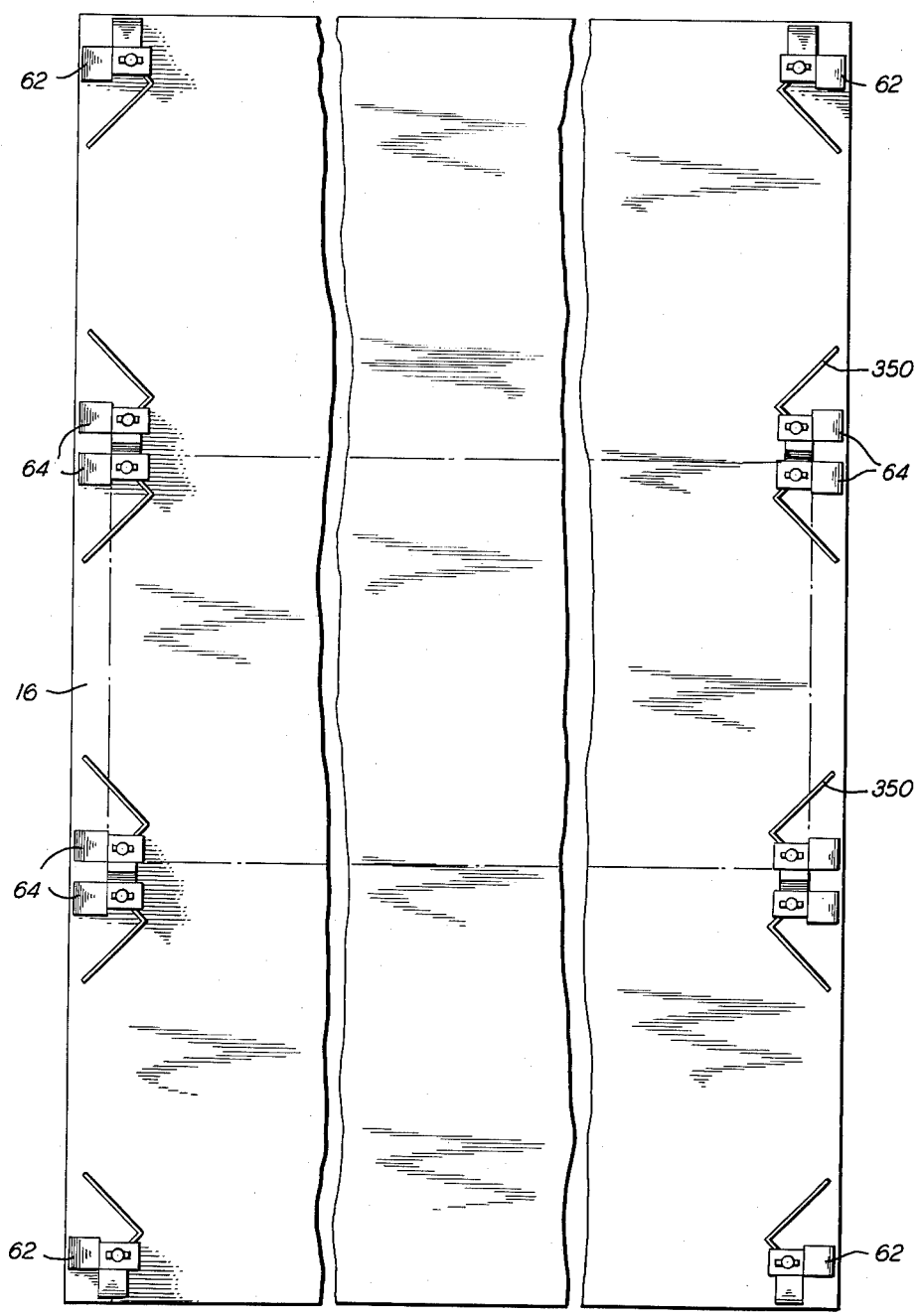
FIG. 33 is a top plan view of a hatch cover showing the corner and intermediate guide means for positioning containers on the hatch cover.

As shown in FIGS. 22, 23 and 26, the hoisting and lowering transmission unit 364 comprises the drive shaft 362 with a bevel pinion 368 splined thereon and oppositely driving the bevel gears 370 and 372 which are keyed respectively on a pair of stub shafts 374 and 376. Each stub shaft is provided with a clutch. In FIGS. 23 and 26, the clutch for the stub shaft 374 is designated 378, and the clutch for the stub shaft 376 is designated 380. The clutch 378 comprises a driving member 382 which is diagrammatically indicated in FIGS. 23 and 26 for movement into and out of engagement with a driven member 384. The clutch 380 is similarly provided with a driving member 386 which is movable into and out of engagement with a driven member 388.

To raise the spreader the driving and driven members of the clutch 380 are engaged to rotate the pinion 390 which is fixed to the driven member 388 of the clutch and is free to rotate on the stub shaft 376. Meshed with this pinion is the gear 392 which is keyed to the shaft 394 to which is keyed the drum 396 (FIG. 23) of a band brake 398.

Splined on the shaft 394 is the hub of a pinion 404 which is meshed with a gear 406 fast on a shaft 408 on which are keyed two spaced pinions 410 which are meshed with gears 412 fixed on a shaft 414. On this shaft 414 are fixed the two winding drums 226 for the cables 54 which are trained around the sheaves 224 on the bridge and the sheaves 216 at opposite ends of one of the walking beams 214. In order to wind the cables 54, operating the other walking beams 214, in the same direction, a shaft 416 carrying the winding drums 226 for the cables 54 of that walking beam is connected by the gear 418 to one of the gears 412. It will be evident from FIG. 26 that the two shafts 414 and 416 rotate in opposite directions, so that the two pairs of cables 54, which extend oppositely fore and aft to the two walking beams, are raised together.

To lower the two walking beams together, requiring reverse rotation of the winding drums 226, the clutch 378 is operated to rotate pinion 421 which is fixed to the driven member 384 of that clutch. The pinion 420 is free to rotate on the stub shaft 374 and is meshed with the gear 422 which is splined to the shaft 394. Thus the shaft 394 is rotated to drive the pinion 404 and the gear 406, which results in the winding drums 226 being rotated oppositely from the direction heretofore described, so as to lower the cables 54 and hence the walking beams and spreader.

In broken lines in FIG. 23 is shown at 424 a Wichita holding brake, which is a spring-set, air released, fail-safe braking device. The arrangement is such that air pressure must be supplied to permit rotation of the shaft 394. Hence, upon failure of the pressure for any reason the brake will be set and the shaft locked against rotation, thus halting the entire operation and preventing accidental dropping of the spreader and any attached load.

To propel the bridge athwart the ship, along the gantry trackway, successively to port and to starboard as required in each loading or unloading operation, the main shaft 362 drives the transmission 366. This mechanism includes a pinion 450 splined on the shaft 362, and another pinion 452 which is loose on the shaft and connected with the driven member 454 of a clutch 456 whose driving member 458 is fast on the shaft. The pinion 450 is geared, through mechanism that will now be described, to drive the bridge to the port side of the ship, and the pinion 452 operates to drive to starboard.

The fast pinion 450 is meshed with a gear 458 fixed on a shaft 460 on which a pinion 462 is freely rotatable. The pinion 452 is meshed with a gear 464 fast on a shaft 466 on which is fixed a gear 468 which is meshed with the pinion 462. The shaft 460 is provided with a clutch 470 having a driving member 472 engageable with a driven member 474 which is fixed on the sleeve 476 on which is fixed the pinion 462. Thus the shaft 466 is rotated in either direction depending on the conditions of the clutches 456 and 470.

Between the gears 464 and 468, the shaft 466 carries a fixed pinion 478 which is meshed with a gear 480 fast on a shaft 482. A pinion 484 fixed on this shaft is meshed with a gear 486 fixed on a shaft 488 carrying a fixed pinion 490 which is meshed with a gear 492 fast on the bridge drive shaft 188 which, it will be recalled, carries the pinions 186 that are engaged with the racks 100 for driving the bridge along the gantry trackway.

The gear train comprising the pinion 484, gear 486, pinion 490 and gear 492, constitutes a speed reduction mechanism by which rotation of the main drive shaft 362 at a speed appropriate (through a gear box, not shown, between the shaft and its engine or motor) for raising the spreader relatively rapidly, will serve to propel the bridge laterally of the ship at an adequate, lower rate of speed.

To stop this lateral movement of the bridge at the appropriate limit required for fixing the spreader above the cell, hatch cover, or chassis, the shaft 482 is provided with a brake 494 which is applied by air pressure, under the control of the operator, and is spring-released. Another brake, designated 496, is provided on the shaft 482, as a safeguard against failure of the air pressure system. This brake is spring-set and air-released, so that it is maintained in released condition as long as the air pressure system is operative.

FIGS. 38 and 39 illustrate the manner in which the combination of traveling bridge 40, walking beams 214 and spreader 52 operates, through any degree of list of the ship, such as the somewhat exaggerated angle shown in these figures, to position the spreader in a horizontal plane, for engagement with a container 48 or to release a container relative to a truck chassis or other shore-positioned surface, and to position the spreader in an inclined position, corresponding exactly to the list angle of the ship, for movement into or out of a hatch cell or a location on the deck or a hatch cover. This, as has been explained, is an important feature of the invention. With further reference to FIGS. 38 and 39, it will be understood that the combination or assembly of spreader and suspended container is securely "two-blocked" against the bridge during movement between the two positions of the parts shown in these figures. Thus swinging of the load during starting movement of the bridge along the gantry and during deceleration toward the end of that movement is prevented. This greatly speeds the operation of the apparatus and is another important feature of the invention, as will be understood.

As has been explained hereinbefore, in the illustrated embodiment of the invention the controls are housed in a cab 208 containing the operator and mounted on the platform 206 of the spreader 52. Other locations are of course possible and readily arranged. So also with the details of the electrical and/or hydraulic system of controls, operating power and actuating means. In the interest of completing the present disclosure a brief explanation will be given of a simplified system shown schematically in FIGS. 40–42 which may be employed to operate the mechanical structure depicted in the other figures.

The electrical system shown in FIG. 40 comprises a diesel or otherwise driven alternator 500 mounted on the bridge and energizing the several components of the system, including the synchrotie transmitters 502 and 504 mounted in the cab, each having its armature provided with a control handle, and connected respectively to the synchrotie receivers 506 and 508 mounted on the bridge. In the drawing the pair 502–506 function to raise and lower the spreader bar, and the pair 504–508 operate to propel the bridge on the gantry. The armature of each receiver rotates simultaneously with its respective transmitter armature, and through the same number of degrees. The shaft on each receiver is coupled to a cam switch: the shaft 510 of the reciever 506 controlling the hoisting clutch circuit 512 and the lowering clutch circuit 514 by the cam switches 514 and 516 respectively. Each cam is designed so that at the proper stage of its revolution it closes a microswitch which energizes a solenoid to open the air valve. Thus, as the control handle in the cab is moved from "off" to "lower" the receiver and its cam switch are actuated, the lobe of the lowering cam 516 coming under the lowering cam microswitch follower to raise it and close the circuit to the solenoid operating the lowering clutch air valve which then opens, admitting air to the clutch to engage it and to the holding brake to release it. Similarly the hoisting cam 514 is actuated by moving the transmitter handle to "hoist," which causes the appropriate microswitch to energize a solenoid to actuate the hoisting clutch air valve.

Similar arrangements cause operation of the handle of the bridge travel transmitter 504 to "port" or "starboard" to actuate the cams 518, 520 and 522 to open air valves controlling the mechanism 524 for moving the bridge to port, or 526 to starboard, with brake release 528.

The synchrotie receiver 506 for the hoisting system also operates a cam 530, conveniently formed on the end of its shaft opposite that which mounts the hoisting and lowering cams, which operates a variable pressure air valve 532 for supplying air to a cylinder 533 (FIG. 41) to actuate the band load brake 398. This cam is designed to supply air in uniformly increasing pressure as the control handle of the transmitter 502 is moved from half-speed "lower" to "off." Thus the operator is able very accurately to control the lowering speed of the spreader solely by manipulating the single control handle through a portion of the "lower" to "off" range.

The electrical system shown in FIG. 40 also includes an electric motor 540, which may be mounted in the cab, for driving the oil pump 541 (see FIG. 42) supplying the flippers 248 and the tilt lock cylinders 228.

The simplified air control system schematically depicted in FIG. 41 comprises an engine-driven air compressor 550 connected to a reservoir 552 which supplies the several valves as shown in the diagram. These include the solenoid-operated valves 554 and 556 controlling the lowering clutch 380 and the hoisting clutch 378, respectively, in the transmission 364, the variable pressure valve 532 heretofore described, and a two-way check valve 560 for actuating the holding brake 424, all concerned with hoisting and lowering the spreader. Also included in the air system supplied by the reservoir 552 are the solenoid-operated valves 570, 572 and 574 for controlling, respectively, the starboard travel clutch 470, the port travel clutch 456, and the safety retard brake 496 (which it will be recalled is spring-set, air-released). A two-way check valve 580 operates the holding brake 494 in cooperation with actuation of the port and starboard travel clutches.

Finally, FIG. 42 shows, also in simplified, diagrammatic form, the hydraulic system for actuating the flippers 248 and the tilt lock cylinders 228. In this system the oil pump 541, driven by the electric motor 540 (FIG. 40), is connected to the oil reservoir 590 from which conduits lead to a tilt lock control valve 592 and a flipper control valve 594. These valves control, respectively, the tilt lock cylinders 228 and the flipper-operating hydromotors 276.

It is to be understood that in the actual, operating embodiment of the system the controls, electrical, air and hydraulic, were developed with refinements of detail over and above the basic, simplified arrangement of elements diagrammed in FIGS. 40–42 and hereinabove briefly explained. These detailed refinements are not regarded as forming part of the inventive concept of the apparatus and the system but are considered to be optionable and variable within the wide scope of the broader of the appended claims which are directed to the basic relationships of the several components of the physical structure, the control system, and the combination of method steps performed by the apparatus and system in operation. So also with the mechanical details of the apparatus: these too are subject to considerable variation, alteration and substitution within the broad principles of the invention as defined by the claims.

Thus, for example, while there has been illustrated as the preferred embodiment of the invention the combination of walking beams 214 and spreader 52 in which the invention has been reduced to actual practice, because the interposition of the walking beams between the spreader and its suspension from the bridge is productive of important advantages, it is quite possible within the basic principles of the invention to eliminate these beams or, what amounts to virtually the same thing, to operate the illustrated combination with the beams and spreader rigidly connected so as to operate as a single unitary member. That is to say, if one were willing to forego the advantages of smooth and rapid operation afforded by the pivoting of the spreader depicted in FIGS. 38 and 39, the spreader could be hung directly from the cables 54, one connected to each of the four corners of the spreader frame or trained around a sheave 216 mounted on each of such corners. The cables would hang the spreader in a plane parallel to the plane of the traveling bridge 40 and the rails 38 of the bridge trackway, so that the cables and these planes would form the vertical plane parallelogram constituted by the cables, bridge and beam in FIG. 38, and by the cables, bridge and spreader in FIG. 39. In such case the spreader would descend from the gantry of a listing vessel into engagement with a horizontally positioned container by contact of one side before the other, e.g., the righthand side in FIG. 38 before the lefthand side. But as soon as the coupled container becomes lifted off the horizontal supporting surface on which it has been resting, the cables would swing it to an inclined position corresponding to the angle at which the vessel is listing, just as is accomplished in the walking beam-spreader combination by operation of the tilt lock means during elevation from the FIG. 38 position of the parts to swing the spreader into parallelism with the plane of the beams or, as hereinbefore explained, by inducing the proper angle through contact of the spreader with the bridge at the upward limit of elevation and fixation of the induced angle by operation of the tilt lock means at that time. The coupled assembly of container and fixed spreader would descend in the manner shown in FIG. 39, with the parallelogram pattern maintained. It will be appreciated that in the reverse operation of hoisting a container from a deposit area on the vessel, such as the cell 56 under the listing condition shown in FIG. 39, the spreader being lowered onto the container would be canted at an angle corresponding to the angle of list and would be kept at that angle throughout lateral movement along the gantry trackway and lowering to the horizontal plane of the shore deposit area, such as the trailer chassis 50 of FIG. 2. Engagement with that horizontal plane would be made first by one side of the container bottom and then by the other side, accompanied by slackening of the cables on the side making the first contact. It has been found in practice that this is a practical and feasible method of operation, although inferior in smoothness and rapidity of performance to the method by which walking beams are employed to cooperate with the spreader.

In connection with the foregoing it may be stated that, when the containers are of the order of 35 feet in length by 8 feet in width and 8½ feet in height, as in the working embodiment in which the invention has been reduced to practice, substantial non-conformity of lateral angularity of container and cell, i.e., difference between angle of list and lateral canting of the container, can be tolerated without any tendency of the container or spreader to bind in the cell. However, because the length of the container is more than four times its width and height, a much smaller deviation from longitudinal conformity of the planes of vessel or cell space and container would cause objectionable binding or jamming. Normally of course the apparatus automatically obviates this difficulty because the gantry trackway automatically assumes the pitch angle of the ship and the four point suspension of the spreader equally automatically induces this same angle into the suspended spreader and container.

Another detail in which the preferred, illustrated form of construction may be varied within the broad concept of the invention is in respect of the structure of the cells 56. Thus, because the functions of the upright guide angles 58 are primarily that of providing thoroughly strong restraining surfaces for positioning and immobilizing a stack of superposed containers in transit by sea and serving as surfaces for directing the containers and the spreader during ascent and descent in the cells, it is not necessary that angle irons, properly so called, be employed. It is sufficient that the guide means, or the restraining means, be provided with right-angularly related vertical surfaces defining an area of the same size and shape as that of the container and spreader and coact with the specially provided surfaces formed on the container and spreader to engage those surfaces and guide them in their movements and, in the case of the container, hold or restrain them after deposit and stacking. The cells, and the structure that forms the cells, thus constitute elements of a cooperating combination in the present invention by their coaction with the spreader and container surfaces which, it is believed, distinguish the cells and the guide elements thereof from such mere partition elements or stacking frames as have been used in the prior art apart from ship constructions or container handling, transferring and stowing apparatus.

Other and further modifications of the illustrative preferred construction will suggest themselves to those skilled in the art, in the form of mechanical equivalents of the elements here shown, and hence are to be regarded as within the scope and purview of the claims of this application.

I claim:

1. Shipboard freight container transferring apparatus comprising a marine vessel having a flat and normally horizontal stowing area, a gantry having a trackway extending laterally of the vessel in a plane substantially parallel to that of said stowing area, a traveling bridge movable along the trackway, a spreader comprising a generally rectangular frame adapted to be detachably coupled successively to a plurality of box-like containers for transfer between said stowing area of the vessel and an adjacent land area on movement of the bridge along the trackway, a pair of longitudinally spaced parallel walking beams extending laterally of the vessel and pivotally suspending the spreader on a longitudinal axis substantially central of the beams, hoisting cables depending from the bridge and having four runs of substantially equal length each connected to an end portion of one of the beams suspending the beams from the bridge in substantial parallelism to the gantry trackway, means actuating the cables to hoist the beams and spreader until the spreader engages the bridge and becomes tilted thereby so that the plane of the spreader is parallel to the plane of the trackway, and tilt lock means cooperating with the spreader and beams to secure the spreader rigidly to the beams and maintain the parallel relationship of the spreader and trackway while the cable actuating means is operated to pay out the cables to lower the beams, spreader and coupled container onto said stowing area of the vessel.

2. Shipboard freight container transferring apparatus comprising a marine vessel having a hatchway, a gantry having a trackway extending laterally of the vessel in a plane substantially normal to the vertical axis of the hatchway, a traveling bridge movable along the trackway, a spreader comprising a generally rectangular frame adapted to be detachably coupled successively to a plurality of box-like containers for transfer between the hatchway and an adjacent land area on movement of the bridge along the trackway, a pair of longitudinally spaced parallel walking beams extending laterally of the vessel and pivotally suspending the spreader on a longitudinal axis substantially central of the beam, hoisting cables depending from the bridge and having four runs of substantially equal length each connected to an end portion of one of the beams suspending the beams from the bridge in substantial parallelism to the ganty trackway, means actuating the cables to hoist the beams and spreader until the spreader engages the bridge and becomes tilted thereby so that the plane of the spreader is parallel to the plane of the trackway, and tilt lock means cooperating with the spreader and beams to secure the spreader rigidly to the beams and maintain the parallel relationship of the spreader and trackway while the cable actuating means is operated to pay out the cables to lower the beams, spreader and coupled container into the hatchway.

3. Shipboard freight container transferring apparatus as claimed in claim 1 in which the flat and normally horizontal stowing area is the top surface of a hatch cover.

4. Shipboard freight container transferring apparatus as claimed in claim 1 in which the flat and normally horizontal stowing area is within the hold of the vessel and accessible through a hatchway.

5. Shipboard freight container transferring apparatus as claimed in claim 1 in which the flat and normally horizontal stowing area is the top surface of a container stowed on the vessel.

6. Shipboard freight container transferring apparatus as claimed in claim 1 in which the tilt lock means is releasable to free the spreader to hang from its pivot axis on the beams and gravitationally assume a horizontal plane.

7. Shipboard freight container transferring apparatus as claimed in claim 1 in which the gantry trackway is adapted to project beyond a side of the vessel and the tilt lock means is releasable to free the spreader to hang from its pivot axis on the beams when hung beyond the side of the vessel so that the spreader and a coupled container gravitationally assume a horizontal plane.

8. Shipboard freight container transferring apparatus as claimed in claim 1 in which the gantry trackway is adapted to project over a shore area beyond a side of the vessel and the tilt lock means is releasable, after disengagement of the beam and spreader combination from the bridge on descent toward said shore area, to free the spreader to hang from its pivot axis on the beams and gravitationally assume a horizontal plane appropriate for making level contact with a container on said shore area.

9. Shipboard freight container transferring apparatus comprising a marine vessel having a gantry mounted on its deck for fore and aft movement and having a portion adapted to extend beyond the vessel's side, a traveling bridge mounted on the gantry for movement laterally of the vessel, a spreader of substantially rectangular shape in plan having a walking beam pivotally connected to each end portion, means suspending the spreader from the bridge comprising cables hanging the walking beams from the bridge, means for detachably coupling a container to the spreader for transfer, upon movement of the bridge on the gantry, between a location spaced laterally beyond the vessel and a stowing area on the vessel, means for lowering the spreader from the bridge and for hoisting it into fixed engagement with the bridge preparatory to movement of the bridge on the gantry, and tilt control means interposed between the spreader and each walking beam to fix the angular relationship of the spreader and beams during vertical movement.

10. Shipboard freight container transferring apparatus comprising a marine vessel having a gantry mounted on its deck for fore and aft movement and having a portion adapted to extend beyond the vessel's side, a traveling bridge mounted on the gantry for movement laterally of the vessel, a spreader of substantially rectangular shape in plan suspended from the bridge and provided with depending downwardly flaring guide arms for positioning the spreader on a container to be coupled to it, means for detachably coupling a container to the spreader for transfer, upon movement of the bridge on the gantry, between a location spaced laterally beyond the vessel and a stowing area on the vessel, means for lowering the spreader from the bridge and for hoisting it into fixed engagement with the bridge preparatory to movement of the bridge on the gantry, and means for retracting the arms to positions within the plan projection of the spreader.

11. Shipboard freight container transferring apparatus comprising a marine vessel having a gantry mounted on its deck for fore and aft movement and having a portion adapted to extend beyond the vessel's side, a traveling bridge mounted on the gantry for movement laterally of the vessel, a spreader of substantially rectangular shape in plan suspended from the bridge, means for detachably coupling to the spreader a container which is substantially rectangular in plan and of substantially the same area as the spreader for transfer, upon movement of the bridge on the gantry, between a location spaced laterally beyond the vessel and a stowing area on the vessel of the same size and shape as that of the container and spreader, means defining said stowing area comprising vertical corner guides on the vessel arranged to form a cell, means for lowering the spreader from the bridge and for hoisting it into fixed engagement with the bridge preparatory to movement of the bridge on the gantry, and downwardly flaring guide arms provided on the spreader for positioning the spreader on a container to be coupled to it, in combination with means for retracting the arms to positions within the plan projection of the spreader after coupling to a container prior to lowering the coupled container and spreader into the cell.

12. Shipboard freight container transferring apparatus as claimed in claim 11, in which the detachable coupling means comprises twist lugs downwardly projecting from the spreader and within its plan projection.

13. Shipboard freight container transferring apparatus as claimed in claim 11, in which the detachable coupling means comprises four twist lugs, each adjacent to one of the corners of the spreader, downwardly projecting from the spreader and within its plan projection.

14. Shipboard freight container transferring apparatus comprising a marine vessel having a gantry mounted on its deck for fore and aft movement and having a portion adapted to extend beyond the vessel's side, a traveling bridge mounted on the gantry for movement laterally of the vessel, a spreader suspended from the bridge, means for detachably coupling a container to the spreader for transfer, upon movement of the bridge on the gantry, between a location spaced laterally beyond the vessel and a stowing area on the vessel, means for lowering the spreader from the bridge and for hoisting it into fixed engagement with the bridge preparatory to movement of the bridge on the gantry, said stowing area including a hatchway provided with a coaming and a vertical cell defined by upright corner members for guiding vertical movement of a container coupled to the spreader and stowing a plurality of said containers stacked in superposed relation, a cover for the hatchway having a downturned perimetric edge skirt adapted to rest on the coaming, and guide means provided on the coaming having downwardly sloping surfaces for guiding a descending container into the cell and including a movable portion adapted to be retracted to admit the cover skirt to the coaming.

15. Shipboard freight container transferring apparatus as claimed in claim 14, in which the guide means includes an outer fixed portion and an inner movable portion each providing part of said guiding surface, said movable portion being adapted to be retracted to permit the cover skirt to be guided by the guiding surface of the fixed portion to a position resting on the coaming adjacent the fixed portion.

16. Shipboard freight container transferring apparatus comprising a marine vessel having a gantry mounted on its deck for fore and aft movement and having a portion adapted to extend beyond the vessel's side, a traveling bridge mounted on the gantry for movement laterally of the vessel, a container having sockets in its top and bottom for the reception of twist lugs, a stowing area on the vessel comprising a hatch cover provided with upstanding twist lugs fixed in position for rotation thereon for cooperation with the bottom sockets of the container, a spreader suspended from the bridge, twist lugs depending from the spreader for cooperation with the top sockets of the container for detachably coupling the container to the spreader for transfer, upon movement of the bridge on the gantry, between a location spaced laterally beyond the vessel and said stowing area on the vessel, and means for lowering the spreader from the bridge and for hoisting it into fixed engagement with the bridge preparatory to movement of the bridge on the gantry.

17. Shipboard freight container transferring apparatus as claimed in claim 16, including adapters having top and bottom sockets for connecting the hatch cover twist lugs to the spreader twist lugs.

18. Shipboard freight container transferring apparatus comprising a marine vessel having a gantry mounted on its deck for fore and aft movement and having a portion adapted to extend beyond the vessel's side, a traveling bridge mounted on the gantry for movement laterally of the vessel, a spreader suspended from the bridge, means for detachably coupling a container to the spreader for transfer, upon movement of the bridge on the gantry, between a location spaced laterally beyond the vessel and a stowing area on the vessel, and means for lowering the spreader from the bridge and for hoisting it into fixed engagement with the bridge preparatory to movement of the bridge on the gantry, said stowing area on the vessel comprising a hatchway having a pair of vertical cells disposed side by side within it and defined by upright corner members for guiding vertical movement of a container coupled to the spreader and stowing a plurality of said containers stacked in superposed relation, in combination with flip-flop guide means juxtaposed to the upper ends of the adjacent corner members of adjoining cells, each guide means comprising an elongated member provided with container-directing guide surfaces on its opposite faces and having one end hinged between said adjacent corner members and having means on its opposite end for foldably supporting the member alternatively in inclined positions with said guide surfaces directed alternatively into said cells respectively.

19. Shipboard freight container transferring apparatus as claimed in claim 18, including a strut having one end pivoted to said opposite end of the elongated guide member, and including a bearing provided on a wall of the hatchway for supporting the opposite end of the strut to fix the guide member in operative position.

20. Shipboard freight container transferring apparatus comprising a marine vessel subject to listing and having a generally horizontal deck, a gantry mounted on the deck in parallelism thereto and having a portion adapted to extend beyond the side of the vessel, a traveling bridge mounted on the gantry for movement laterally of the vessel in transferring containers between locations on a horizontal area spaced laterally beyond the vessel, beneath the extended portion of the gantry, and stowing areas on the vessel which are inclined while the vessel is listing, a spreader adapted to fit on the top of a container and be detachably coupled successively to the containers of a series to be transferred, an abutment member on the bridge providing an alignment surface parallel to the plane of the stowing areas on the vessel, and mechanism suspending the spreader from the bridge comprising hoisting and lowering cables depending from the bridge, an elongated element carried by said cables and maintained thereby in parallelism to the bridge during listing of the vessel, means pivoting the spreader to said element for free swinging of the spreader to a horizontal plane when above a location on said horizontal area spaced laterally beyond the vessel and for swinging movement of the spreader to an inclined position parallel to the bridge and the element when hoisted by said cables into engagement with said alignment surface, and means for fixing the spreader in said inclined position for movement above said inclined stowing area on the vessel.

21. In a shipboard freight container transferring apparatus of the type wherein a spreader frame mounted on a marine vessel subject to listing becomes coupled to the substantially horizontal surface of a box-like container positioned alongside the vessel and is operated to transfer the container to a stowing surface on the listing vessel, the combination with said spreader frame of a member mounted on the vessel above the stowing surface and having a surface parallel to the plane of said stowing surface and extending over said container position, hoisting means pivotally connected to the spreader frame for elevating the spreader frame, with a container coupled to it, from said position alongside the vessel into engagement with said surface of the member to tilt the frame about said pivotal connection into parallelism with the plane of the stowing surface on the vessel, and means holding the frame in said tilted position, while the hoisting means is operated to lower the frame and the container coupled thereto down onto said stowing surface.

22. In a shipboard freight container transferring apparatus of the type wherein a spreader frame mounted on a marine vessel subject to listing becomes coupled to the top of a box-like container positioned on a stowing surface of the vessel and substantially parallel to said surface and inclined to the horizontal by the degree at which the vessel is listing and elevates said coupled frame and container and transfers the container to a horizontal surface alongside the vessel, the combination with said spreader frame of a member mounted on the vessel above the stowing surface and having a surface parallel to the plane of the stowing surface, hoisting means pivotally connected to the spreader frame for elevating the spreader frame into engagement with said surface of the member to tilt the frame about said pivotal connection into parallelism with the plane of the stowing surface, means holding the frame in said tilted position while the frame is lowered into coupling connection with a container on said stowing surface and transferred to a position elevated above the horizontal surface alongside the vessel, and means releasing the holding means when the container is in said elevated position so that the container is free to descend untilted onto said horizontal surface.

23. Shipboard freight container transferring apparatus comprising a marine vessel subject to listing, hoisting means including a traveling bridge mounted on the vessel and movable between a position over a stowing area on the vessel and a position over a substantially horizontal area alongside the vessel, a coupling member mounted in depending relation on said bridge for coupling connection to a box-like container positioned on said horizontal area, means including an element pivotally connected to the coupling member for elevating the container for movement by the bridge to a position over the stowing area on the vessel while the vessel is listing, abutment means carried by the bridge and engageable by said coupling member for tilting the coupling member and the elevated container about the pivotal connection to said element to the angle at which the vessel is listing, and means acting on the coupling member for maintaining it and the container at said angle and simultaneously lowering it and the container onto the stowing area on the vessel.

24. Shipboard freight container transferring apparatus comprising a marine vessel subject to listing, hoisting means including a traveling bridge mounted on the vessel and movable between a position over a stowing area on the vessel and a position over a substantially horizontal area alongside the vessel, a coupling member mounted in depending relation on said bridge for lowering into coupling connection with a box-like container positioned on the stowing area of the vessel at an angle to the horizontal while the vessel is listing, means including an element pivotally connected to the coupling member for elevating the container for transverse movement by the bridge to a position over said substantially horizontal area alongside the vessel, abutment means carried by the bridge and fixed at said angle and engageable by the coupling member prior to lowering thereof acting on said member for tilting it to said angle about the pivotal connection to said element, means holding the coupling member and the container at said angle during elevation and transverse movement, and means for releasing said holding means and leaving the container free to assume a horizontal position for lowering onto said horizontal surface alongside the vessel.

References Cited in the file of this patent

UNITED STATES PATENTS

| | | |
|---|---|---|
| 1,437,964 | Fitch | Dec. 5, 1922 |
| 1,555,022 | Proctor | Sept. 29, 1925 |
| 1,591,278 | Brush | July 6, 1926 |
| 1,701,965 | Wood | Feb. 12, 1929 |
| 1,860,733 | Fitch | May 31, 1932 |
| 1,900,867 | Olds | Mar. 7, 1933 |
| 1,959,216 | Owen | May 15, 1934 |
| 1,975,094 | Fitch | Oct. 2, 1934 |
| 2,063,916 | Fitch | Dec. 15, 1936 |
| 2,212,064 | Elliott | Aug. 20, 1940 |
| 2,247,144 | Baldwin | June 24, 1941 |
| 2,457,841 | Smith et al. | Jan. 4, 1949 |
| 2,514,045 | Gardenhire | July 4, 1950 |
| 2,555,297 | Smith et al. | May 29, 1951 |
| 2,660,319 | Dorland | Nov. 24, 1953 |
| 2,670,859 | Zeckendorf et al. | Mar. 2, 1954 |
| 2,696,920 | Anjeskey | Dec. 14, 1954 |
| 2,799,403 | Friedman | July 16, 1957 |